US012405558B2

(12) United States Patent
Wakatsu et al.

(10) Patent No.: US 12,405,558 B2
(45) Date of Patent: Sep. 2, 2025

(54) FIXING DEVICE PROVIDED WITH HEATER AND IMAGE FORMING APPARATUS

(71) Applicant: CANON KABUSHIKI KAISHA, Tokyo (JP)

(72) Inventors: Kohei Wakatsu, Kanagawa (JP); Tsuguhiro Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/653,877

(22) Filed: May 2, 2024

(65) Prior Publication Data

US 2024/0288807 A1 Aug. 29, 2024

Related U.S. Application Data

(62) Division of application No. 17/884,480, filed on Aug. 9, 2022, now Pat. No. 12,001,157.

(30) Foreign Application Priority Data

Aug. 23, 2021 (JP) ................................ 2021-135856

(51) Int. Cl.
*G03G 15/20* (2006.01)

(52) U.S. Cl.
CPC ................................ *G03G 15/2039* (2013.01)

(58) Field of Classification Search
CPC ................................................ G03G 15/2039
See application file for complete search history.

(56) References Cited

U.S. PATENT DOCUMENTS

| | | | | |
|---|---|---|---|---|
| 5,465,141 | A | 11/1995 | Asano et al. | |
| 6,178,299 | B1 | 1/2001 | Kim | G03G 21/00 |
| 2010/0158555 | A1 | 6/2010 | Ota | |
| 2012/0230742 | A1 | 9/2012 | Nakagawa et al. | G03G 15/20 |
| 2012/0243894 | A1 | 9/2012 | Umeda et al. | G03G 15/20 |
| 2015/0331371 | A1 | 11/2015 | Nakajima | G03G 15/20 |

(Continued)

FOREIGN PATENT DOCUMENTS

| | | | |
|---|---|---|---|
| JP | H04322286 | A | 11/1992 |
| JP | 2001-100558 | | 4/2001 |

(Continued)

OTHER PUBLICATIONS

Japanese Patent Office dated Mar. 25, 2025 in counterpart Japanese Patent Appln. No. 2021-135856.

*Primary Examiner* — Stephanie E Bloss
*Assistant Examiner* — Michael A Harrison
(74) *Attorney, Agent, or Firm* — Venable LLP

(57) ABSTRACT

A fixing device includes a heater provided with a first heat generator on a substrate and a second heat generator of which a length in a longitudinal direction is shorter than that of the first heat generator, a temperature detector of the heater, a switch for switching a power supply path from an AC power source to the first heat generator or the second heat generator. A controller for controlling the switch to supply power to the first heat generator or the second heat generator. The controller executes a first control in which the switch supplies the power to the first heat generator, and switches a second control in which the switch supplies the power alternately to the first heat generator or the second heat generator when the detected temperature reaches a threshold temperature.

19 Claims, 15 Drawing Sheets

(56) References Cited

U.S. PATENT DOCUMENTS

| | | | | |
|---|---|---|---|---|
| 2016/0033908 | A1 | 2/2016 | Tsunashima et al. .. | G03G 15/20 |
| 2016/0327894 | A1 | 11/2016 | Tsunashima et al. .. | G03G 15/20 |
| 2016/0342117 | A1 | 11/2016 | Minamishima et al. .................... | G03G 15/20 |
| 2017/0060052 | A1 | 3/2017 | Narahara et al. ...... | G03G 15/20 |
| 2017/0192378 | A1 | 7/2017 | Hashiguchi et al. .. | G03G 15/20 |
| 2017/0315485 | A1 | 11/2017 | Tsunashima et al. .. | G03G 15/20 |
| 2017/0343929 | A1 | 11/2017 | Narahara et al. ...... | G03G 15/20 |
| 2018/0074444 | A1 | 3/2018 | Wakatsu et al. ....... | G03G 15/20 |
| 2018/0074445 | A1 | 3/2018 | Nishida et al. ........ | G03G 15/20 |
| 2018/0173140 | A1 | 6/2018 | Imaizumi et al. ..... | G03G 15/20 |
| 2018/0181039 | A1 | 6/2018 | An et al. ................ | G03G 15/20 |
| 2018/0348678 | A1 | 12/2018 | Nakamoto et al. .... | G03G 15/20 |
| 2018/0373189 | A1 | 12/2018 | Wakatsu et al. ....... | G03G 15/20 |
| 2019/0171145 | A1 | 6/2019 | Imaizumi et al. ..... | G03G 15/20 |
| 2020/0192253 | A1 | 6/2020 | Morihara et al. | |
| 2020/0233346 | A1 | 7/2020 | Sato et al. ............. | G03G 15/20 |
| 2020/0233348 | A1 | 7/2020 | Nakajima et al. ..... | G03G 15/20 |
| 2020/0233349 | A1* | 7/2020 | Takano .............. | G03G 15/2042 |
| 2020/0233350 | A1 | 7/2020 | Oi et al. ................. | G03G 15/20 |
| 2020/0233352 | A1 | 7/2020 | Doda et al. ............ | G03G 15/20 |
| 2020/0249600 | A1 | 8/2020 | Yoshida et al. .... | G03G 15/2039 |
| 2020/0292981 | A1 | 9/2020 | Nagashima | |
| 2020/0301330 | A1 | 9/2020 | Yoshida et al. ........ | G03G 15/20 |
| 2020/0371459 | A1 | 11/2020 | Takeda et al. ......... | G03G 15/20 |
| 2021/0063923 | A1 | 3/2021 | Odate et al. ........... | G03G 15/20 |
| 2021/0072680 | A1 | 3/2021 | Yoshida et al. .... | G03G 15/2039 |
| 2021/0072681 | A1 | 3/2021 | Wakatsu et al. ... | G03G 15/2039 |
| 2021/0072683 | A1 | 3/2021 | Yoshida et al. | |
| 2021/0072684 | A1 | 3/2021 | Doda et al. ............ | G03G 15/20 |
| 2021/0132528 | A1 | 5/2021 | Sato et al. ............. | G03G 15/20 |
| 2021/0165351 | A1 | 6/2021 | Doda et al. ............ | G03G 15/20 |
| 2021/0232072 | A1 | 7/2021 | Nakajima et al. ..... | G03G 15/20 |
| 2021/0278793 | A1 | 9/2021 | Maeda et al. .......... | G03G 15/00 |
| 2021/0278794 | A1 | 9/2021 | Nakajima .............. | G03G 15/00 |
| 2021/0333732 | A1 | 10/2021 | Yoshida et al. .... | G03G 15/2039 |
| 2021/0333733 | A1 | 10/2021 | Doda et al. ............ | G03G 15/20 |
| 2022/0057736 | A1 | 2/2022 | Doda et al. ............ | G03G 15/20 |
| 2022/0100128 | A1 | 3/2022 | Nakamoto et al. .... | G03G 15/20 |
| 2022/0253006 | A1 | 8/2022 | Doda et al. ............ | G03G 15/20 |
| 2022/0299912 | A1 | 9/2022 | Yoshida et al. ........ | G03G 15/20 |
| 2022/0299914 | A1 | 9/2022 | Doda ..................... | G03G 15/20 |
| 2022/0308509 | A1 | 9/2022 | Wakatsu et al. ....... | G03G 15/20 |
| 2022/0365475 | A1 | 11/2022 | Nakajima et al. ..... | G03G 15/00 |
| 2023/0064449 | A1 | 3/2023 | Nakamoto et al. .... | G03G 15/20 |
| 2023/0067803 | A1 | 3/2023 | Yoshida et al. ........ | G03G 15/20 |

FOREIGN PATENT DOCUMENTS

| | | | |
|---|---|---|---|
| JP | 2008250061 | A | 10/2008 |
| JP | 2017021287 | A | 1/2017 |
| JP | 202098286 | A | 6/2020 |
| JP | 2020115184 | A | 7/2020 |
| JP | 2020115185 | A | 7/2020 |
| JP | 2020115186 | A | 7/2020 |
| JP | 2020-126205 | | 8/2020 |
| JP | 2020129021 | A | 8/2020 |
| JP | 2020148827 | A | 9/2020 |
| JP | 2021006879 | A | 1/2021 |
| JP | 2021-043246 | | 3/2021 |
| JP | 2021-043248 | | 3/2021 |
| JP | 2021043245 | A | 3/2021 |
| KR | 20200090129 | A | 7/2020 |

* cited by examiner

FIXING DEVICE PROVIDED WITH HEATER AND IMAGE FORMING APPARATUS

CROSS-REFERENCE TO RELATED APPLICATIONS

This application is a divisional of U.S. application Ser. No. 17/884,480 filed Aug. 9, 2022, currently pending; and claims priority under 35 U.S.C. § 119 to Japan Application JP 2021-135856 filed in Japan on Aug. 23, 2021; and the contents of all of which are incorporated herein by reference as if set forth here in full.

FIELD OF THE INVENTION AND RELATED ART

The present invention relates to a fixing device and an image forming apparatus which is provided with the fixing device.

In the fixing device of the image forming apparatus which performs image forming on a recording material, the toner image is fixed onto the recording material as the recording material passes through a fixing nip portion which is formed by abutting a fixing film which heats a toner image on the recording material with a pressing roller which presses the toner image. When the recording materials, which are narrower than a width of the heater (heating device) which heats the fixing film with respect to a longitudinal direction, are continuously printed, a phenomenon of paper non-passage portion temperature rise, in which temperature gradually rises in an area (non-passage portion) of the fixing nip portion in which the recording material does not pass through, occurs. And when temperature in the non-passage portion rises significantly, fixing members of the fixing device such as the fixing film and the pressing roller, may be damaged by the rise in temperature. Therefore, for example, in Japanese Laid-Open Patent Application (JP-A) 2001-100558, a constitution, in which paper non-passage portion temperature rise is reduced in the fixing device by switching a plurality of heating members with different lengths of heaters with respect to a longitudinal direction, is proposed.

In a method which is described above, when temperature reaches a predetermined temperature in a center portion of heaters of the fixing device with respect to the longitudinal direction, a control which switches a plurality of heating members is performed. However, depending on a state of the fixing device, after that, it may take time for temperature at end portions of the heaters with respect to a longitudinal direction to rise to temperature which is suitable for image forming, or on the contrary, paper non-passage portion temperature rise may occur, therefore temperature control of the heaters is required according to the state.

SUMMARY OF THE INVENTION

According to an aspect of the present invention, there is a provided a fixing device for fixing an unfixed toner image on a recording material to the recording material, the fixing device comprising, a first rotatable member, a heater provided with a first heat generating member on a substrate and a second heat generating member of which a length in a longitudinal direction is shorter than a length of the first heat generating member; and constituted to heat the first rotatable member, a first temperature detecting unit constituted to detect a temperature of the heater, a second rotatable member constituted to form a nip portion with the first rotatable member, a switching unit constituted to switch a power supply path from an AC power source to the first heat generating member or the second heat generating member, a control unit constituted to control the switching unit to supply power to the first heat generating member or the second heat generating member, wherein the control unit executes a first control in which the switching unit supplies the power to the first heat generating member, and switches a second control in which the switching unit supplies the power alternately to the first heat generating member or the second heat generating member when the temperature detected by the first temperature detecting unit reaches a threshold temperature.

Further features of the present invention will become apparent from the following description of exemplary embodiments with reference to the attached drawings.

DESCRIPTION OF THE EMBODIMENTS

In the following, embodiments of the present invention will be specifically described with reference to figures. In the following embodiments, passing a recording material through a fixing nip portion of the fixing device is referred to as passing through. Further, an area in which the recording material is not passed through in the fixing nip portion which corresponds to an area in which heating members heat is referred to as a non-passage area (or a non-passage portion), and an area in which the recording material is passed through is referred to as a passage area (or a passage portion). Furthermore, a phenomenon in which temperature of the non-passage area of the fixing nip portion becomes higher than that of the passage area is referred to as paper non-passage portion temperature rise.

First Embodiment

[Constitution of Image Forming Apparatus]

Figure 1:
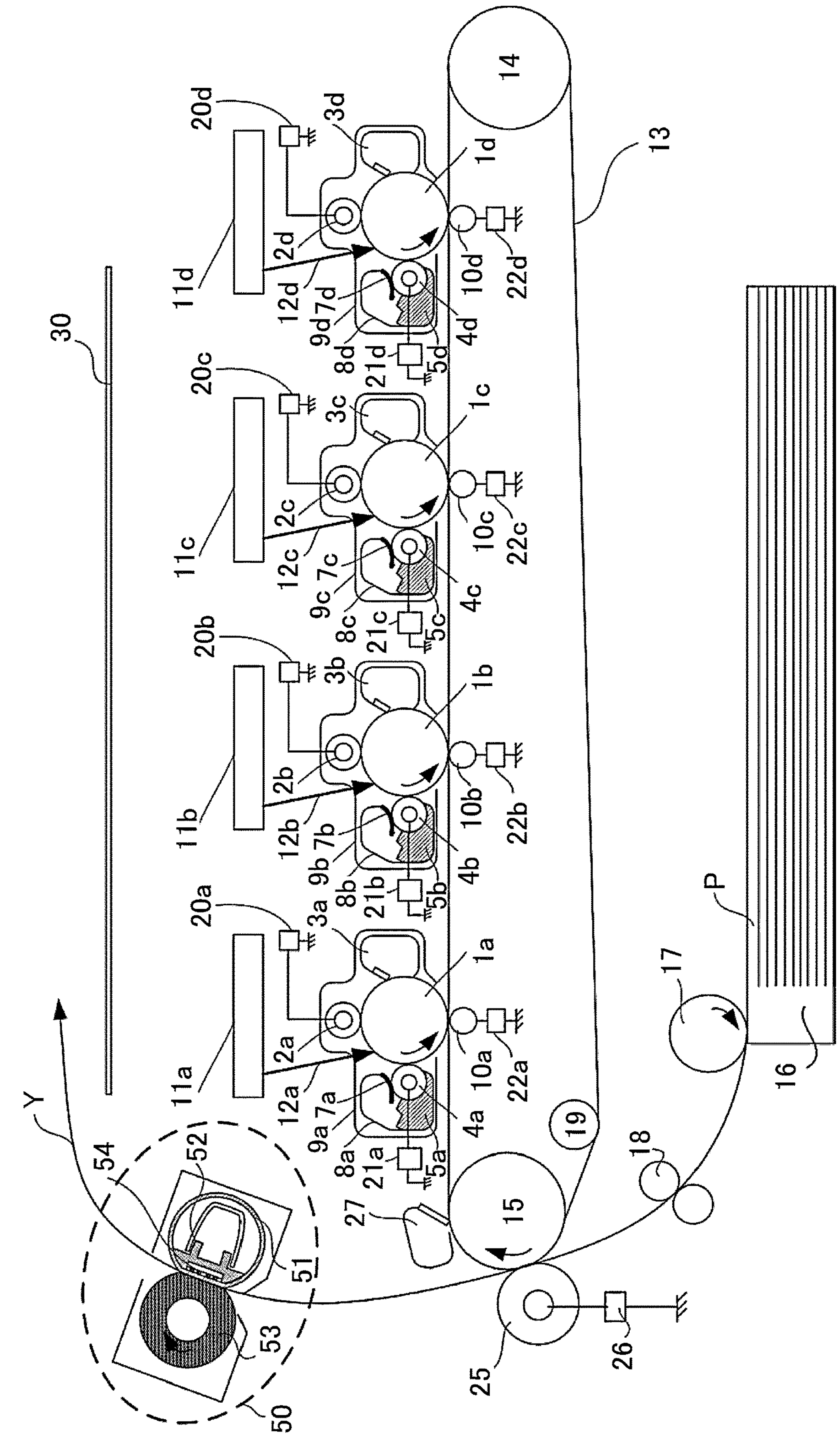
FIG. 1 is a view showing an overall constitution of an image forming apparatus in from first through fourth embodiments.

FIG. 1 is a sectional view showing a constitution of an in-line type color image forming apparatus, which is an image forming apparatus in which the fixing device is mounted according to the first embodiment. A constitution of the electrophotographic color image forming apparatus will be described by using FIG. 1. Incidentally, a first station is a station for image forming of yellow (Y) toner, and a second station is a station for image forming of magenta (M) toner. Further, a third station is a station for image forming of cyan (C) toner, and a fourth station is a station for image forming of black (K) toner.

In the first station, a photosensitive drum 1*a* which is an image bearing member is an OPC photosensitive drum. The photosensitive drum 1*a* includes multiple layers of functional organic materials, which are constituted of a carrier generating layer which generates an electric charge on metal cylinder by being exposed to light, a charge transporting layer which transports the generated charge, etc., and an electrical conductivity of an outermost layer of the photosensitive drum 1*a* is low and the outermost layer of the photosensitive drum 1*a* is substantially insulated. A charging roller 2*a*, which is a charging unit, is abutted with the photosensitive drum 1*a*, and as the photosensitive drum 1*a* rotates, the charging roller 2*a* is rotationally driven and uniformly charges a surface of the photosensitive drum 1*a*. A superimposed voltage of DC voltage or AC voltage is applied to the charging roller 2*a*, and discharge is generated in a tiny air gap in an upstream side and a downstream side with respect to a rotational direction of the photosensitive drum 1*a* from the nip portion between the charging roller 2*a* and the surface of the photosensitive drum 1*a*. In this way, the photosensitive drum 1*a* is electrically charged. A cleaning unit 3*a* cleans toner which is remained on the photosensitive drum 1*a* after a primary transfer which will be described below. A developing unit 8*a* which is a developing unit accommodates non-magnetic single-component toner 5*a*, and includes a developing roller 4*a* and a developer applying blade 7*a*. The photosensitive drum 1*a*, the charging roller 2*a*, the cleaning unit 3*a* and the developing unit 8*a* are accommodated in an integrated process cartridge 9*a* (image forming portion) which is dismountable from the image forming apparatus.

An exposure device 11*a* which is an exposure unit is constituted of a scanner unit or an LED (light emitting diode) array which reflects laser light by a rotatable polygon mirror and scans on photosensitive drum 1*a*, and emits scanning beam 12*a*, which is modulated according to an image signal, onto the photosensitive drum 1*a*. Further, the charging roller 2*a* is connected to a charging high-voltage power source 20*a* which is a voltage supply unit to the charging roller 2*a*. The developing roller 4*a* is connected to a developing high-voltage power source 21*a*, which is a voltage supply unit to the developing roller 4*a*. A primary transfer roller 10*a* is connected to a primary transfer high-voltage power source 22*a* which is a voltage supply unit to the primary transfer roller 10*a*. A constitution of the first station is as described above, and the second station, the third station and the fourth station include similar constitutions. As for the second station, the third station and the fourth station, same reference numeral is attached to a part which includes a same function as the first station, and b, c and d are attached as a subscript of the reference numeral for each station. Incidentally, in a description below, the subscripts a, b, c and d are omitted except in a case of describing a specific station.

An intermediary transfer belt 13 is supported by three rollers of a secondary transfer opposing roller 15, a tension roller 14 and an auxiliary roller 19 as stretching member of the intermediary transfer belt 13. A force in a direction in which the intermediary transfer belt 13 is stretched by a spring (not shown) is applied to only the tension roller 14, so that an appropriate tension force to the intermediary transfer belt 13 is maintained. The secondary transfer opposing roller 15 rotates by receiving rotational drive from a main motor 99 (see FIG. 2), and the intermediary transfer belt 13, which is wound around an outer periphery, rotates. The intermediary transfer belt 13 moves at substantially same speed in a direction of an arrow (for example, in a clockwise direction in FIG. 1), with respect to the photosensitive drums from 1*a* through 1*d* (for example, rotating in a counterclockwise direction in FIG. 1). Further, the primary transfer roller 10 is arranged at a position opposing the photosensitive drum 1 via the intermediary transfer belt 13 and is rotationally driven as a movement of the intermediary transfer belt 13. A position in which the photosensitive drum 1 is abutted with the primary transfer roller 10 via the intermediary transfer belt 13 is referred to as a primary transfer position. The auxiliary roller 19, the tension roller 14 and the secondary transfer opposing roller 15 are electrically grounded. Incidentally, since constitutions of primary transfer rollers from 10*b* through 10*d* of from the second through the fourth stations are similar to the first transfer roller 10*a* of the first station, so descriptions are omitted.

[Image Forming Operation]

Next, an image forming operation of the image forming apparatus which is shown in FIG. 1 will be described. When the image forming apparatus receives a print command during a standby state, it starts the image forming operation. The photosensitive drum 1, the intermediary transfer belt 13, etc. start to rotate at a predetermined process speed in the direction of the arrow in the figure by the main motor 99 (see FIG. 2). The photosensitive drum 1*a* is uniformly charged by the charging roller 2*a* to which voltage is applied by the charging high-voltage power source 20*a*, and then an electrostatic latent image based on image information is formed by the scanning beam 12*a* which is emitted from the exposure device 11*a*. Toner 5*a* in the developing unit 8*a* is negatively charged by the developer applying blade 7*a* and applied to the developing roller 4*a*. And a predetermined developing voltage is applied to the developing roller 4*a* by the developing high-voltage power source 21*a*. When the electrostatic latent image which is formed on the photosensitive drum 1*a* by rotating the photosensitive drum 1*a* reaches the developing roller 4*a*, the electrostatic latent image is visualized by adhering negative polarity toner, and a toner image of a first color (for example, Y (yellow)) is formed on the photosensitive drum 1*a*. Each station (process cartridges from 9*b* through 9*d*)) of other colors of M (magenta), C (cyan) and K (black) (process cartridges 9*b* through 9*d*) also operates in a similar way. While delaying a writing signal from a controller (not shown) at a timing corresponding to an interval between primary transfer positions of each color, the electrostatic latent image is formed on each of the photosensitive drums from 1*a* through 1*d* by the scanning beam 12 from the exposure device 11. DC high voltage of opposite polarity to the toner is applied to each of the primary transfer rollers from 10*a* through 10*d*. In this way, the toner images on the photosensitive drums from 1*a* through 1*d* are transferred to the intermediary transfer belt 13 sequentially (hereinafter referred to as a primary transfer), and a multiple toner image is formed on the intermediary transfer belt 13.

After that, as the toner image is formed, a paper P which is a recording material which is stacked in a cassette 16 (paper feeding portion), is fed by a paper feeding roller 17 which is rotationally driven by a paper feeding solenoid (not shown). The fed paper P is fed to a registration roller 18 (hereinafter referred to as a registration roller) by a feeding roller (not shown). The paper P is synchronized with the toner image on the intermediary transfer belt 13 and is fed to the transfer nip portion which is an abutting portion between the intermediary transfer belt 13 and the secondary transfer roller 25 by the registration roller 18. A voltage of opposite polarity to the toner is applied to the secondary transfer roller 25 by the secondary transfer high-voltage power source 26, and multiple toner images of four color which are borne on the intermediary transfer belt 13 are transferred to the paper P (on the recording material) at one time (hereinafter referred to as a secondary transfer). On the other hand, the toner which remains on the intermediary transfer belt 13 after the secondary transfer is completed is cleaned by a cleaning unit 27. After the secondary transfer is completed, the paper P is fed to the fixing device 50, and the paper P in which the toner image is fixed is discharged to a discharge tray 30 as a formed image (print, copy). Incidentally, a fixing film 51, a nip forming member 52, a pressing roller 53 and a heater 54 of the fixing device 50 will be described below.

[Control Block of the Image Forming Apparatus]

Figure 2:
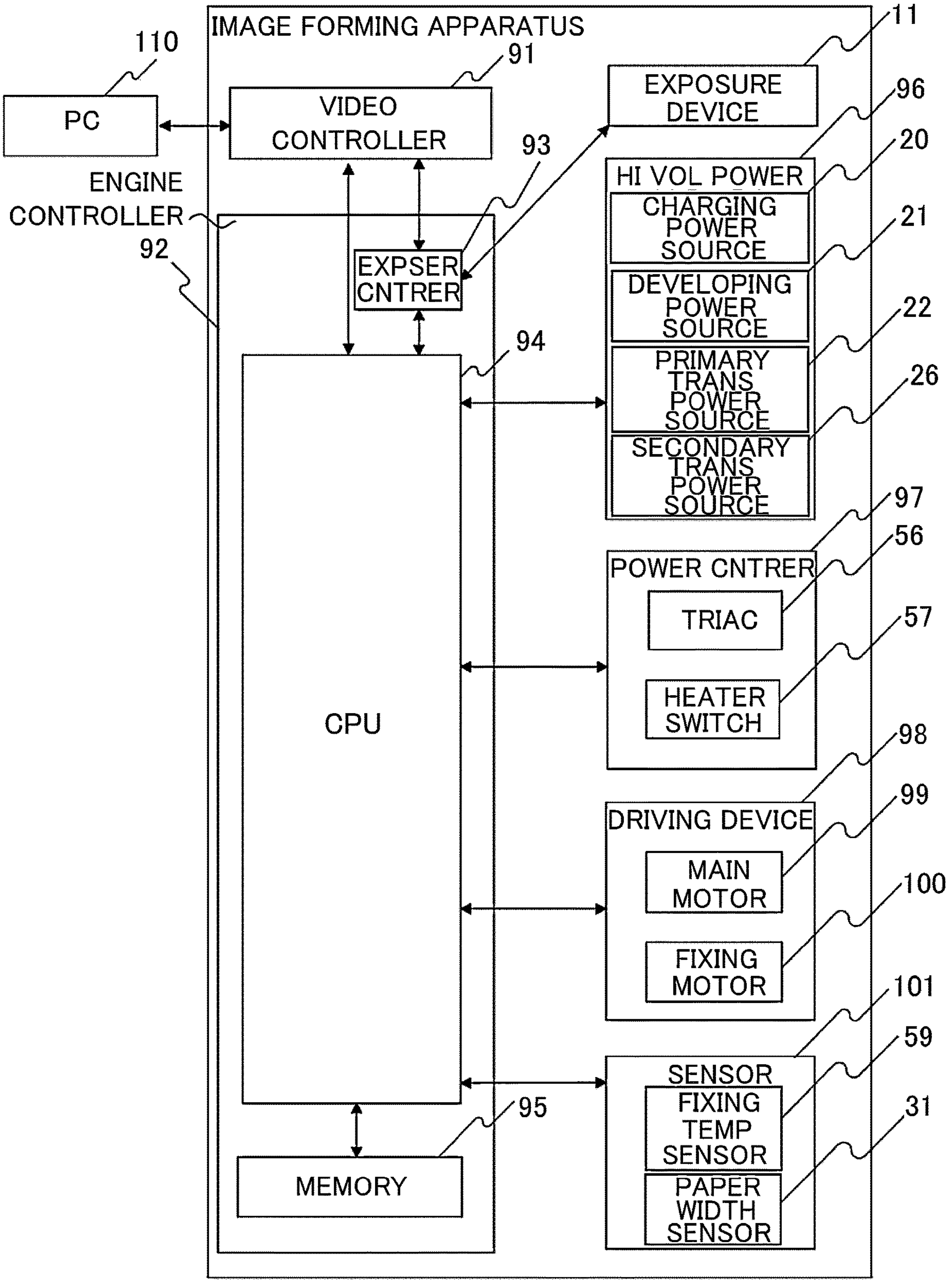
FIG. 2 is a block diagram showing a constitution of a control portion of the image forming apparatus in the first embodiment and the second embodiment.

FIG. 2 is a block diagram showing a constitution of a control portion of the image forming apparatus and a printing operation of the image forming apparatus will be described with reference to the diagram. A PC 110 which is a host computer sends a print command which includes image data of print image and printing information to a video controller 91 which is mounted inside the image forming apparatus.

The video controller 91 converts the image data which is received from the PC 110 into exposure data, and forwards it to an exposure control device 93 in an engine controller 92 and also sends the print command to the CPU 94. The exposure control device 93 is controlled by the CPU 94 and controls the exposure device 11 which turns the laser light on and off according to the exposure data. When the CPU 94, which is a control unit, receives the print command from the video controller 91, it starts the image forming operation.

The CPU 94, a memory 95, etc. are mounted on the engine controller 92. The CPU 94 operates according to a program which is stored in the memory 95 in advance. Further, the CPU 94 includes a timer which measures time and the memory 95 stores various information which controls the fixing device 50 which will be described below. The high-voltage power source 96 is constituted of the charging high-voltage power source 20, the developing high-voltage power source 21, the primary transfer high-voltage power source 22 and the secondary transfer high-voltage power source 26, which are described above. Further, a fixing power control device 97 is constituted of a bidirectional thyristor 56 (hereinafter referred to as a triac) which is a supply control portion, a heating member switching device 57 (see FIG. 6) as a switching portion which exclusively selects the heating member to which power is supplied, etc. The fixing power control device 97 selects the heating member to which power is supplied in the fixing device 50 and determines an amount of power to be supplied.

A driving device 98 is constituted of the main motor 99, a fixing motor 100, etc. Further, a sensor 101 is constituted of a fixing temperature sensor 59 which is a temperature detecting unit which detects temperature of the fixing device 50, a paper width sensor 31 which detects width of the paper P, etc., and a detection result of the sensor 101 is transmitted to the CPU 94. The CPU 94 acquires the detection result of the sensor 101, and controls the exposure device 11, the high-voltage power source 96, the fixing power control device 97 and the driving device 98, based on the detection result. Thus, the CPU 94 forms the electrostatic latent image, transfers the developed toner image onto the paper P and fixes the transferred toner image onto the paper P, etc., and controls an image forming process in which the image data which is received from the PC 110 is printed on the paper P as the toner image. Incidentally, the image forming apparatus to which the present invention is applied is not limited to the image forming apparatus of the constitution which is described in FIG. 1, however, the image forming apparatus may be an image forming apparatus which is capable of printing the paper P with different width and which is provided with the fixing device 50 which includes the heater 54 as will be described below.

[Constitution of the Fixing Device]

Next, a constitution of the fixing device 50, which controls a heating device (heater) which heats the toner image on the paper P by the heating member, will be described by using FIG. 3. Here, "longitudinal direction" refers to a direction of a rotational axis of the pressing roller 53 which is substantially perpendicular to a feeding direction of the paper P which will be described below. Further, a length of the paper P in a direction which is substantially perpendicular to the feeding direction of the paper P (longitudinal direction) refers to width of paper.

Figure 3:
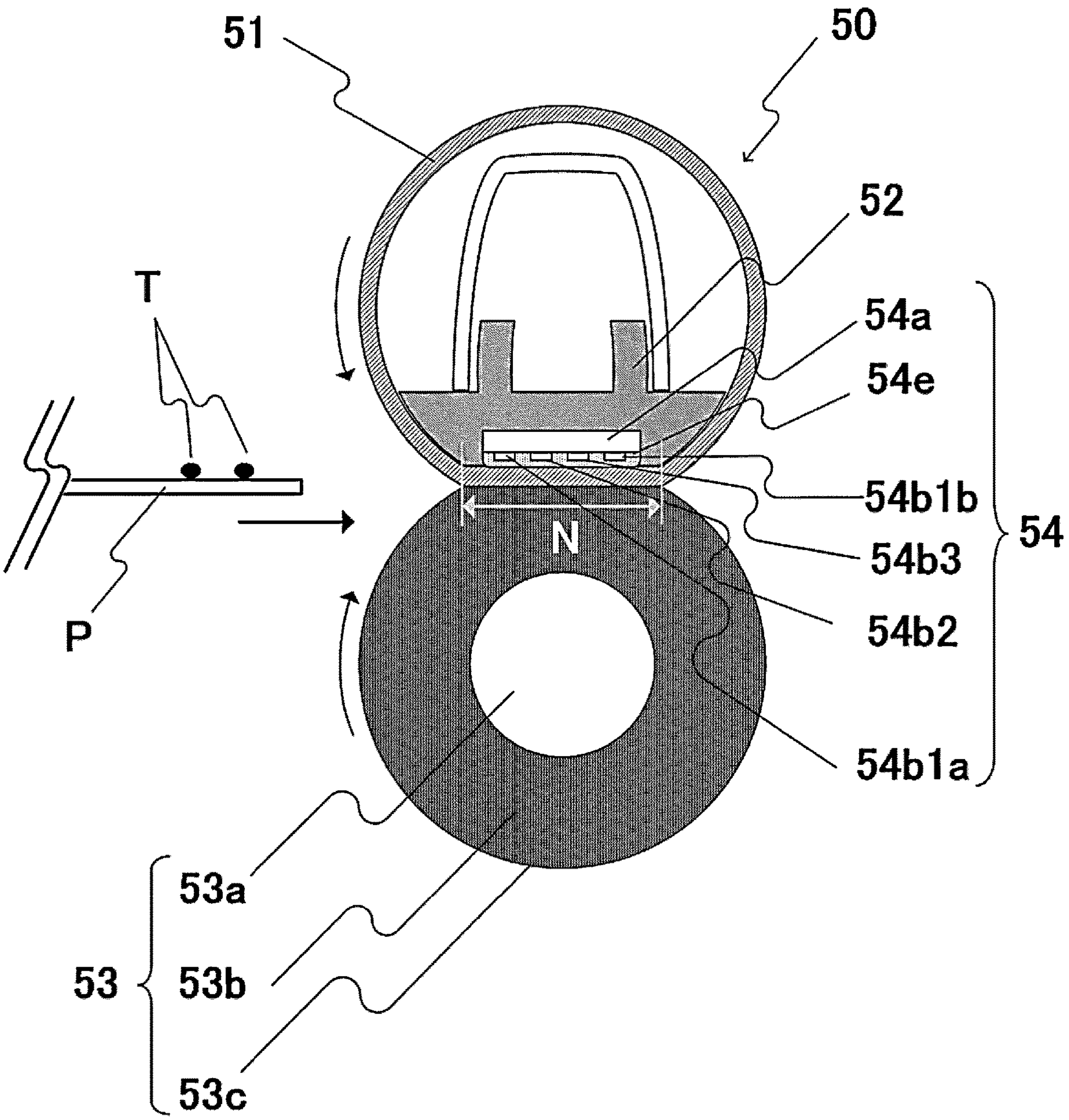
FIG. 3 is a schematic sectional view illustrating a constitution of a fixing device in from the first through the fourth embodiments.

FIG. 3 is a schematic sectional view illustrating a constitution of the fixing device 50. In the fixing device 50, the paper P which bears the unfixed toner image T is fed from a left side of the figure in a direction of an arrow in the figure, toward the fixing nip portion N which is constituted by abutting the fixing film 51 (hereinafter referred to as a film 51) with the pressing roller 53. In the fixing nip portion N, the fixing film 51 is nipped between the fixing roller 53 and the heater 54. And the paper P is heated while being fed in the fixing nip portion N from the left side in the right direction in the figure, and the toner image T is fixed on the paper P. The fixing device 50 is constituted of the cylindrical film 51, the nip forming member 52 which holds the film 51, a pressing roller 53 which forms the fixing nip portion N together with the film 51 and the heater 54 (heater portion) which heats the paper P.

The film 51 is a fixing film as a first rotating member. For example, polyimide is used for a base layer of the film 51, and an elastic layer which is made of silicone rubber and a release layer which is made of PFA are formed on the base layer. Grease is applied to an inner surface of the film 51 in order to reduce frictional force which is generated between the nip forming member 52, the heater 54 and the film 51 by rotation of the film 51.

The nip forming member 52 guides the film 51 from an inside and also forms the fixing nip portion N between the film 51 and the pressing roller 53. The nip forming member 52 is a member which is rigid, heat-resistant and heat-insulating, and is formed of liquid crystalline polymer, etc. The film 51 is externally fitted onto the nip forming member 52. The pressing roller 53 is a roller as a second rotating member and is constituted of a core metal 53*a*, an elastic layer 53*b* and a release layer 53*c*. The pressing roller 53 is rotatably held at both end portions with respect to the longitudinal direction and is rotationally driven by the fixing motor 100 (FIG. 2), and the film 51 is rotated as the pressing roller rotates. The heater 54 which is a heating member is arranged in an inner space of the fixing film 51, is held by the nip forming member 52 and is in contact with an inner surface of the film 51. Details of the heater 54 will be described below.

[Overview of the Heater Portion]

Figure 4:
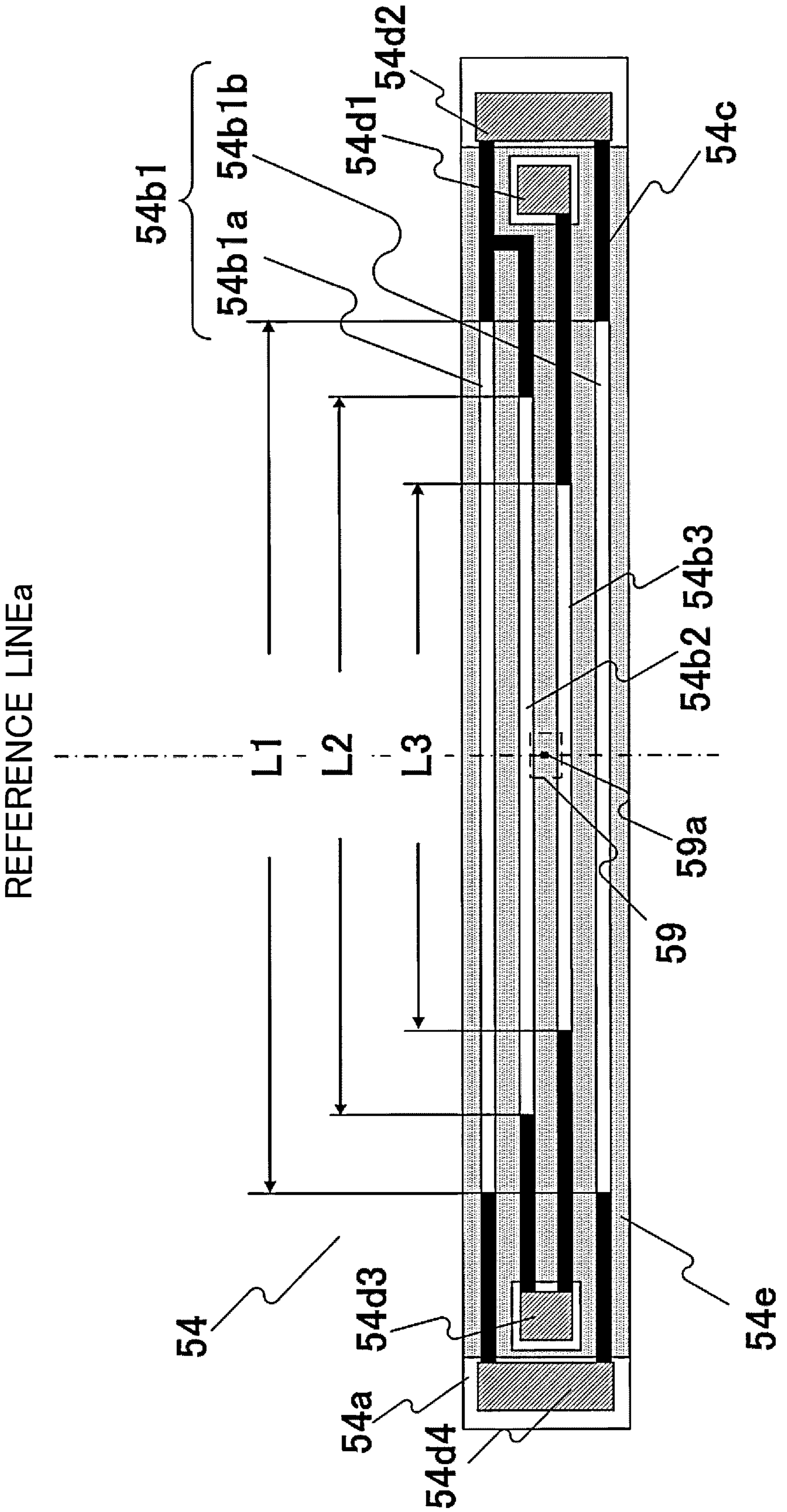
FIG. 4 is a schematic diagram showing a constitution of heaters in from the first through the fourth embodiments.

Next, the heater 54, which is a heating portion, will be described. FIG. 4 is a schematic view illustrating a constitution of the heater 54 when the heater 54 in which the heating members are arranged is viewed from a side of the pressing roller 53 which is shown in FIG. 3. In FIG. 4, a reference line a is a centerline of the heating members 54*b*1*a*, 54*b*1*b*, 54*b*2 and 54*b*3 with respect to the longitudinal direction, and is also a centerline of the paper P which is fed to the fixing nip portion N in the fixing device 50 with respect to the longitudinal direction (direction of width of paper). As shown in FIG. 4, the heater 54 includes a board 54*a*, the heating members 54*b*1*a*, 54*b*1*b*, 54*b*2 and 54*b*3, a conductor 54*c*, contact points from 54*d*1 through 54*d*4 and a protective glass layer 54*e*. The conductor 54*c* is a portion which is painted black in the figure. The board 54*a* in the embodiment is made of alumina ($Al_2O_3$) which is ceramic.

Alumina ($Al_2O_3$), aluminum nitride (AlN), zirconia ($ZrO_2$), silicon carbide (SiC), etc. are widely known as ceramic board, and among them, alumina ($Al_2O_3$) is inexpensive and readily available. Further, the board 54*a* may be made of metal which is excellent in strength. In a case that a metal board is used, stainless steel (SUS) is excellent in price and strength and preferably used. Further, insulating layer may be provided and used for both a ceramic board and a metal board, in case that they are conductive. The heating members 54*b*1*a*, 54*b*1*b*, 54*b*2 and 54*b*3, the conductor 54*c* and the contact points from 54*d*1 through 54*d*4 are arranged on the board 54*a* (on the board), and in order to ensure insulation between each of the heating members and the film 51, the protective glass layer 54*e* is coated on top of them.

Length of each heating member in the longitudinal direction (length in a lateral direction in FIG. 4) is different, and a length L1 of the heating members 54*b*1*a* and 54*b*1*b* in the longitudinal direction is 222 mm, a length L2 of the heating member 54*b*2 in the longitudinal direction is 188 mm and a length L3 of the heating member 54*b*3 in the longitudinal direction is 154 mm. A size relationship among the length L1, the length L2 and the length L3 in the longitudinal direction is the length L1>the length L2>the length L3. For example, in a case that the paper P which is used is A4 size, the heating members 54*b*1*a* and 54*b*1*b* are used. In a case that the paper P which is used is B5 size, the heating member 54*b*2 is mainly used. In a case that the paper P which is used is A5 size, the heating member 54*b*3 is mainly used. Further, each heating member is arranged in order of the heating members 54*b*1*a*, 54*b*2, 54*b*3 and 54*b*1*b* in a short direction (in a vertical direction in FIG. 4).

As shown in FIG. 4, the heating members 54*b*1*a* (first heating member) and 54*b*1*b* (fourth heating member) are electrically connected to a contact point 54*d*2 (first contact point) on one end side and to a contact point 54*d*4 (fourth contact point) on the other end side respectively via the conductor 54*c*. Further, the heating member 54*b*2 is electrically connected to the contact point 54*d*2 on one end side and to a contact point 54*d*3 (third contact point) on the other end side via the conductor 54*c*. Similarly, the heating member 54*b*3 is electrically connected to the contact point 54*d*1 (second contact point) on one end side and to a contact point 54*d*3 on the other end side via the conductor 54*c*. Incidentally, as shown in FIG. 4, lengths of the heating members 54*b*1*a* and 54*b*1*b* in the longitudinal direction are same as the length L1, and the two heating members 54*b*1*a* and 54*b*1*b* are always used at a same time. Hereafter, a pair of the heating members 54*b*1*a* and 54*b*1*b* are collectively referred to as the heating member 54*b*1. Further, a resistance value of the heating member 54*b*1 is 10.7 ohms (combined resistance of heating members 54*b*1*a* and 54*b*1*b*), a resistance value of the heating member 54*b*2 is 24.1 ohms and a resistance value of the heating member 54*b*3 is 24.1 ohms. When a power source voltage of the AC power source 55 (see FIG. 6) is 120 V, the maximum value of average power of each heating member is as follows: the heating member 54*b*1 is 1346 W, and the heating member 54*b*2 and the heating member 54*b*3 are 598 W.

In FIG. 4, an area which is surrounded by a dashed line is the fixing temperature sensor 59. The dashed line indicates that the fixing temperature sensor 59 is arranged on a back side of the heater board 54*a* (opposite side of a surface in which the heating members 54*b*1, 54*b*2 and 54*b*3 are arranged) and also indicates a position in which the fixing temperature sensor 59 is abutted with the heater board 54*a*. A main thermistor 59*a* which detects temperature of the fixing temperature sensor 59, is arranged on a centerline of the heating members 54*b*1, 54*b*2 and 54*b*3 with respect to the longitudinal direction and on the reference line a which is a centerline of the paper P which is fed to the fixing device 50. In the embodiment, the fixing temperature sensor 59, which is a first temperature detecting unit, is arranged in a center of the heater 54 with respect to the longitudinal direction, however, an arrangement position of the fixing temperature sensor 59 is not limited to this position. Although an effect of the present invention may be obtained when the fixing temperature sensor 59 is arranged within a range of the fixing nip portion N, it is more preferable that the fixing temperature sensor 59 is arranged inside the heating member 54*b*3 with respect to the longitudinal direction which is a heating member whose length is short with respect to the longitudinal direction.

[Constitution of the Heater Portion]

Figure 5:
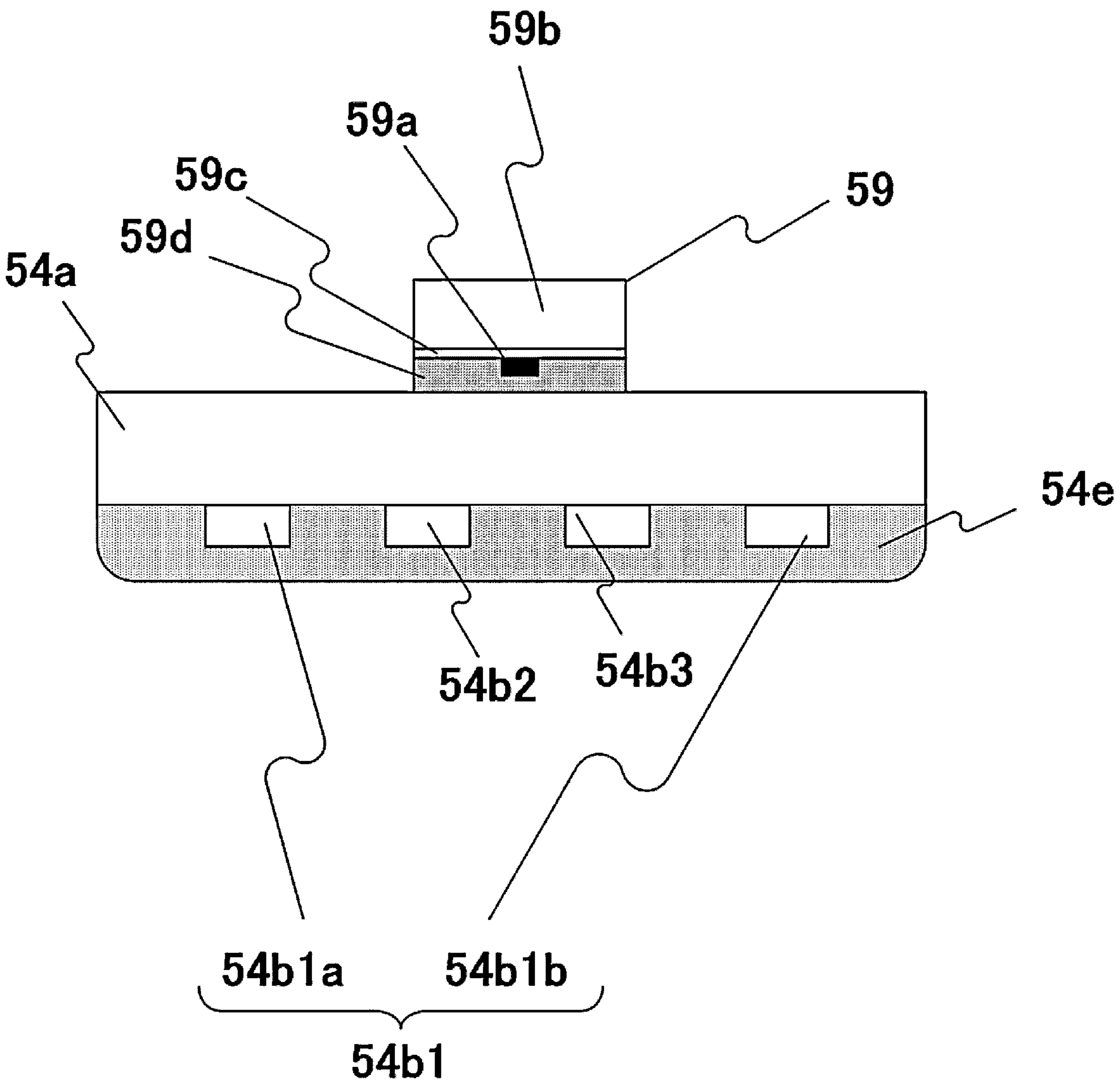
FIG. 5 is a schematic diagram showing a sectional view of the heaters in from the first through the fourth embodiments.

FIG. 5 shows a schematic diagram showing a section of the heater 54, when the heater 54, which is shown in FIG. 4, is cut at the centerline of the paper P with respect to the longitudinal direction (the reference line a in FIG. 4) which is fed to the fixing device 50. The fixing temperature sensor 59, which is a temperature detecting unit which detects the temperature of the heater 54, includes following members. That is, the fixing temperature sensor 59 is constituted of the thermistor 59*a*, a holder 59*b*, a ceramic paper 59*c* which blocks heat conduction between the holder 59*b* and the thermistor 59*a*, and an insulating resin sheet 59*d* which physically and electrically protects the thermistor 59*a*. The thermistor 59*a* is a temperature detecting element whose resistance value changes and whose output voltage changes according to the temperature of the heater 54, and is connected to the CPU 94 by Dumet wire (not shown) and wiring. The CPU 94 controls the temperature of the heater 54, based on a temperature detection result of the fixing temperature sensor 59 (the thermistor 59*a*). The fixing temperature sensor 59 is arranged on a surface opposite side of a surface of the board 54*a* in which the heating members 54*b*1, 54*b*2 and 54*b*3 which are covered by the protective glass layer 54*e* and is in contact with the board 54*a*.

[Power Control Circuit]

Figure 6:
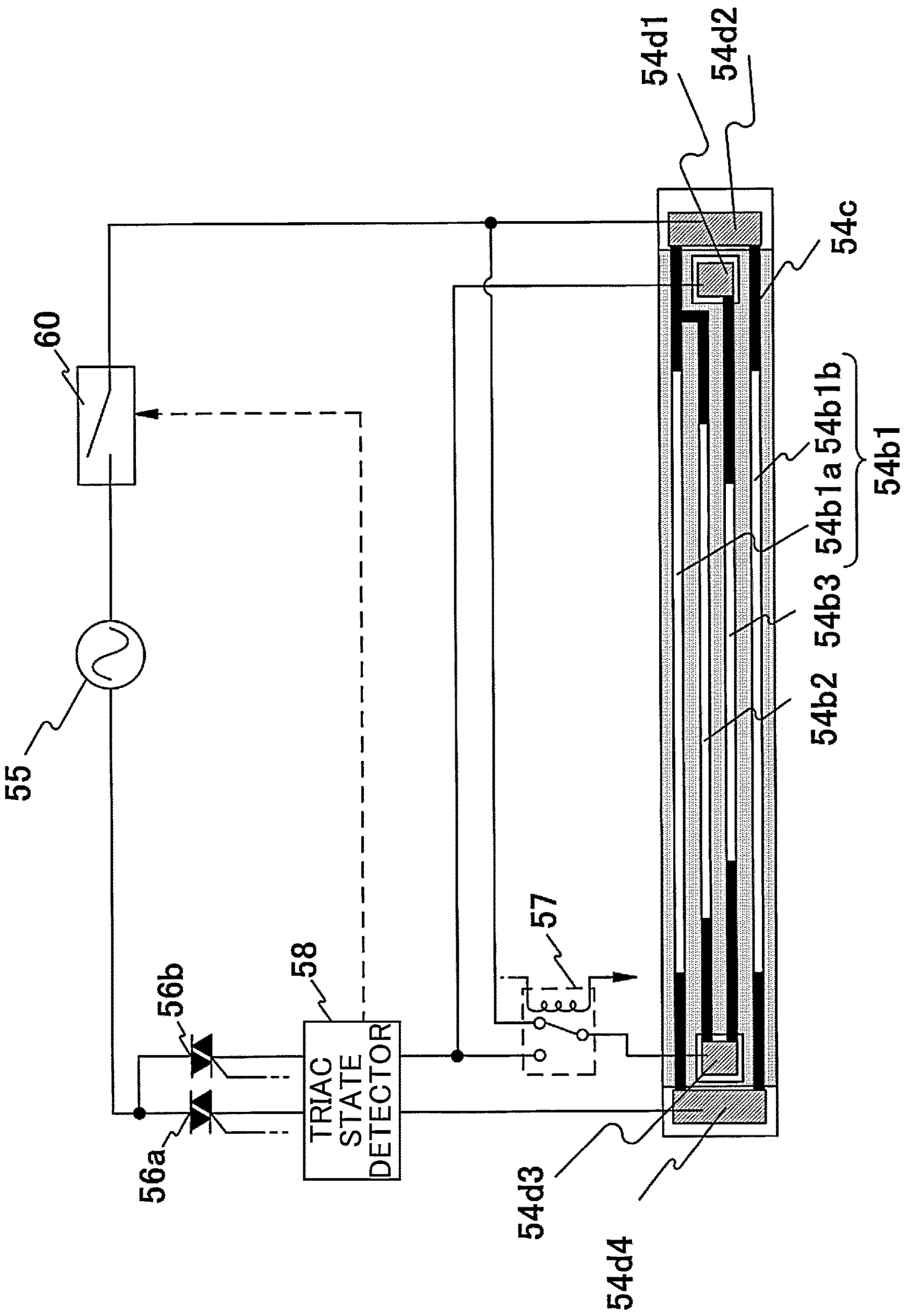
FIG. 6 is a schematic diagram showing a constitution of a power control circuit of a fixing device in the first embodiment and the second embodiment.

FIG. 6 is a schematic diagram showing a constitution of a power control circuit of the fixing device 50. The fixing device 50 in the embodiment forms a desired temperature distribution of the heater 54 with respect to the longitudinal direction by switching the heating members to which power is supplied according to a size of the paper P.

The power control circuit of the fixing device 50 includes the triacs 56*a* and 56*b* which are switching units which connect or disconnect power supply paths, a triac condition detecting portion 58 and a relay 60 (second relay) which blocks the power supply to all of the heating members. The triacs 56*a* and 56*b* connect or disconnect the power supply path from the AC power source 55 to each of the heating members 54*b*1, 54*b*2 and 54*b*3. The heating member switching device 57 is constituted of a changeover contact relay in the embodiment (hereafter referred to as a relay 57). Further, the triac condition detecting portion 58 monitors ON condition or OFF condition of the triacs 56*a* and 56*b*.

The triac 56*a* (first switch) connects (ON condition) or disconnects (OFF condition) the power supply path between the AC power source 55 and the contact point 54*d*4 of the heater 54. On the other hand, the triac 56*b* (second switch) connects (ON condition) or disconnects (OFF condition) the power supply path between the AC power source 55 and the contact point 54*d*3 of the heater 54 via the relay 57, or between the AC power source 55 and the contact point 54*d*1 of the heater 54. The relay 57 (first relay) is capable of switching the contact point 54*d*3 of the heater 54 to connect the triac 56*b* or the AC power source 55.

For example, in a case of supplying power to the heating member 54*b*1 from the AC power source 55, the triac 56*a* is turned on to connect the AC power source 55 to the contact point 54*d*4 of the heater 54, and turn off the triac 56*b*. Thus, the heating members 54*b*1 (54*b*1*a*, 54*b*1*b*) are connected to the AC power source 55 via the contact points 54*d*2 and 54*d*4 of the heater 54. Further, in a case of supplying power to the heating member 54*b*2 from the AC power source 55, the triac 56*b* is turned on to connect the AC power source 55 to the relay 57, the relay 57 is controlled to connect the contact point 54*d*3 of the heater 54 to the triac 56*b*, and the triac 56*a* is turned off. Thus one end of the heating member 54*b*2 is connected to the AC power source 55 via the contact point 54*d*3 of the heater 54, the relay 57 and the triac 56*b*, and the other end of the heating member 54*b*2 is connected to the AC power source 55 via the contact point 54*d*2 of the heater 54.

Further, in a case of supplying power to the heating member 54*b*3 from the AC power source 55, the triac 56*b* is turned on, the relay 57 is controlled to connect the contact point 54*d*3 of the heater 54 to the AC power source 55, and the triac 56*a* is turned off. Thus one end of the heating member 54*b*3 is connected to the AC power source 55 via the contact point 54*d*3 of the heater 54, the relay 57, and the other end of the heating member 54*b*3 is connected to the AC power source 55 via the contact point 54*d*1 of the heater 54. Incidentally, an operation of ON and OFF of the triacs 56*a* and 56*b* is performed by a command (control signal) from the CPU 94.

The triac condition detecting portion 58 detects the ON condition and the OFF condition of the triacs 56*a* and 56*b*. In a case that the triacs 56*a* and 56*b* are turned on simultaneously due to an unexpected failure of the CPU 94, for example, the triac condition detecting portion 58 forcibly blocks the power supply from the AC power source 55 to the fixing device 50 (heater 54) by setting the relay 60 to the OFF condition. Thus, a situation, that only one of the triacs 56*a* and 56*b* is in the ON condition or both of them are in the OFF condition, is secured, and it is possible to prevent failure of the fixing device 50.

In this way, the triacs 56*a* and 56*b*, the triac condition detecting portion 58, and the relay 57 operate as switching portions which switch connections of the power supply paths so that power is supplied to only one of the three heating members 54*b*1, 54*b*2 and 54*b*3 from the AC power source 55. In the embodiment, the switching portions with the constitutions are used, however, the switching portions may be capable of supplying power to only one of the heating members and a constitution for controlling the power supply path is not limited to the constitution which is described above.

Further, in the embodiment, a usage ratio of heating members 54*b*1, 54*b*2 and 54*b*3 (which is also a power supply ratio to the heating members 54*b*1, 54*b*2 and 54*b*3) is controlled according to the size of the paper P to form a desired temperature distribution of the heater with respect to the longitudinal direction. The CPU 94 calculates an amount of power which is required to set the heater 54 to the desired temperature from temperature information in which the fixing temperature sensor 59 (the thermistor 59*a*) detects. In the embodiment, PI control is used, however, a control method is not limited to PI control.

In order to achieve the desired usage ratio of the heating members, the CPU 94 operates the triacs 56*a* and 56*b* and the heating member switching device 57 and allocates usage time (time ratio of power supply) of each of the heating members 54*b*1, 54*b*2 and 54*b*3. Switching of the heating member is performed every cycle of power frequency of the AC power source 55. For example, in a case that the usage ratio (power supply ratio) of the heating members 54*b*1*a* and 54*b*1*b* is 2 and the usage ratio (power supply ratio) of the heating member 54*b*2 is 8, a state that the AC power source 55 is connected to the heating member 54*b*1 is continued for a period of 1 cycle×2=2 cycles. After that, an operation, of switching the heating members to which power is supplied, continuing a state that the AC power source 55 is connected to the heating member 54*b*2 for a period of 1 cycle×8=8 cycles, and connecting the AC power source 55 to the heating member 54*b*1 again, is repeated. In the embodiment, the usage ratio (power supply ratio) is possible to switch from 10:0 to 0:10 in increments of ratio 1.

In the embodiment, as described above, the desired usage ratio of the heating members (power supply ratio) is achieved by allocating the power supply time to the desired heating members, however, a method is not limited to this. An amount of power supplied to each of the heating members may be distributed by time, voltage, electric current, or a combination of two of them. For example, the desired power supply ratio to each of the heating members may be achieved by mounting the triacs on each of the heating members as a heating member control unit, switching the ON/OFF conditions of each of the triacs by the CPU 94 to control an amount of electric current which is supplied to each of the heating members. Further, a resolution (from 10:0 to 0:10) of the usage ratio (power supply ratio) is not limited to this.

[Count Temperature Prediction Method]

Next, a count temperature prediction method which is a temperature prediction unit which predicts temperature of each member of the fixing device 50, will be described. In the embodiment, the temperature of each member of the fixing device 50 (for example, the film 51, the pressing roller 53, the nip forming member 52, etc.) is predicted by using a count value. The count value is updated by the CPU 94 and is added by +1 for each sheet of the paper P which is fixed in the fixing device 50. The greater a number of sheets of the paper P which is processed for fixing in the fixing device 50, the greater the count value becomes. On the other hand, in a standby state after the fixing process is completed, each member of the fixing device 50 cools down naturally, so the count value is also subtracted and decreased with time. Specifically, a cooling characteristics of each member of the fixing device 50 is examined in advance, and the count value is decreased by using a calculation formula in which an elapsed time is variable. In this way, a method of predicting the temperature of each member of the fixing device 50 by managing the count value is referred to as a count temperature predicting method.

A period from the count value of 0 to the first count value is referred to as a zone 1, and a period from the first count value to the second count value is referred to as a zone 2, and the CPU 94 changes a switching frequency of the heating members according to the zone number. The number of zones is not limited to two, however, it may be three or more. In the embodiment, the first count value is 30, the second count value is 100 and the third count value is 200, and the zones are divided into four zones: the zone 1, the zone 2, the zone 3 and the zone 4. When printing is started from a Cold condition (the count value is 0) in which the temperature of the fixing device 50 is room temperature, the first count value reaches 30 at a time of printing 30 sheets. Therefore, the zone 1 ends when a fixing process for the 30th sheet of the paper P is completed, and switches to the zone 2 from the 31st sheet of paper P.

Next, an actual operation during printing in the embodiment will be described. Here, a case of continuous printing of the A5 size paper P will be described. In the embodiment, the fixing device 50 performs fixing operation of the A5 size paper P by switching between the heating member **54*b*1 whose length (width) with respect to the longitudinal direction is the largest and the heating member 54*b*3 whose width with respect to the longitudinal direction corresponds to the width of the A5 size paper P. Incidentally, in a case of continuous printing of the B5 size paper P, the fixing device 50 performs fixing operation of the paper P by switching between the heating member 54*b*1 whose length (width) with respect to the longitudinal direction is the largest and the heating member 54*b*2 whose width with respect to the longitudinal direction corresponds to the width of the B5 size paper P. Similarly, in a case of continuous printing of the A4 size or the letter size paper P, the fixing device 50 performs fixing operation of the paper P by using only the heating member 54*b*1** whose length (width) with respect to the longitudinal direction is the largest. In a following, as an example of printing on paper P, the A5 size paper P will be used for printing.

In a case that the zone number which is described above is small, each member of the fixing device 50 is in a low temperature and, in this case, more power is supplied to the heating member **54*b*1 which is a heating member whose length with respect to the longitudinal direction is the longest. The reason for this is to melt grease which is inside the film 51 uniformly in the fixing nip portion N with respect to the longitudinal direction. When there are some low temperature areas due to temperature unevenness in the film 51 with respect to the longitudinal direction, since the grease does not melt uniformly, a sliding resistance of the film 51 is not uniform with respect to the longitudinal direction, and, as a result, the film 51** may be deformed.

On the other hand, in a case that the zone number is greater, each member of the fixing device 50 is in a higher temperature and, in this case, power is supplied to the heating member **54*b*1 at a constant rate and more power is supplied to the heating member 54*b*3. This prevents the film 51 from deforming due to dropping temperature at end portions of the heating member with respect to the longitudinal direction and uniformity of sliding resistance of the film 51. However, when the temperature at the end portions of the heating member with respect to the longitudinal direction becomes too high, it may exceed heat resistance temperature of the film 51 and damage the film 51. Further, when the temperature at the end portions of the heating member with respect to the longitudinal direction is too low or too high compared to temperature at a center portion, it may cause uneven temperature of the paper P which passes through the fixing nip portion N. As a result, in an area of end portions of the paper P which passes through the fixing nip portion N, excessive or insufficient heat supply to the toner on the paper P may occur and poor image quality may occur. Therefore, in a case of printing the paper P whose paper width is small, it is preferable to keep temperature difference between a paper passage area of the film 51 in which the paper P passes through and a paper non-passage area of the film 51** in which the paper P does not pass through within an appropriate range.

[Usage Ratio of the Heating Members and Amount of Power Supplied in Each Zone]

Table 1 which is shown below is a table showing a usage ratio (power supply ratio) of the heating members **54*b*1 and 54*b*3 in each zone when the A5 size paper P is printed and amounts of maximum average power supply in case that the power source voltage is 120V and 110V. The usage ratio indicates a usage ratio of the heating member 54*b*1 vs. the heating member 54*b*3. In a case that AC voltage of the AC power source 55 is 120V, the maximum value of the average power of the heating member 54*b*1 is 1346 W and the maximum value of the average power of the heating member 54*b*3 is 598 W. Further, in a case that the AC voltage of the AC power source 55 is 110V, the maximum value of the average power of the heating member 54*b*1 is 1131 W and the maximum value of the average power of the heating member 54*b*3 is 502 W. In a case of controlling the usage ratio of the heating member as shown in Table 1, the maximum value of the average power also changes according to the usage ratio of heating members. In a case that the power source voltage is 120V and the zone is the zone 4, for example, the maximum value of the average power is 1346 W (the heating member 54*b*1)×(2/10)+598 W (the heating member 54*b*3)×(8/10)=747.6 W≈748 W. Similarly, in a case that the power source voltage is 110V and the zone is the zone 3, the maximum value of the average power is 1131 W (the heating member 54*b*1)×(4/10)+502 W (the heating member 54*b*3**)×(6/10)=753.6 W≈754 W.

TABLE 1

| | Zone | | | |
|---|---|---|---|---|
| | 1 | 2 | 3 | 4 |
| Usage ratio (heating member 54b1:heating member 54b3) | 10:0 | 5:5 | 4:6 | 2:8 |
| Maximum average power [W] at 120 V of power source voltage | 1346 | 972 | 897 | 748 |
| Maximum average power [W] at 110 V of power source voltage | 1131 | 816 | 754 | 628 |

Even when the heater 54 of the fixing device 50 is sufficiently warmed up, in a case that the paper P does not pass through the fixing nip portion N for a long period of time, it is preferable to control the temperature of the heater 54 by using the heating member (the heating member **54*b*1 in the embodiment) whose width (length) with respect to the longitudinal direction is long. This is because temperature difference between the paper passage area and the paper non-passage area is less likely to increase when the fixing nip portion N is heated uniformly across the width with respect to the longitudinal direction, since the paper P, which takes amount of heat from the heater 54, does not pass through the fixing nip portion N. Further, this is because it is possible to achieve the temperature of the heater 54** to a target temperature more quickly, since larger amount of power supply over an entire width of the fix nip portion N with respect to the longitudinal direction is possible when the heating member whose width (length) with respect to the longitudinal direction is long.

On the other hand, in a case that the paper P does not pass through the fixing nip portion N for a long period of time, temperature may drop in the paper non-passage area of the fixing nip portion N when the power supply is switched between the heating member whose width with respect to the longitudinal direction is long (for example, the heating member **54*b*1) and the heating member whose width with respect to the longitudinal direction is short (for example, the heating member 54*b*3). Further, a time for achieving the target temperature of the heater 54 may longer since the amount of the average power which is supplied is decreased by switching control of the heating members. In the embodiment, the temperature of the heater 54 is controlled as described below, during a warmup period before the paper P reaches the fixing nip portion N, or in a case that there is an interval from the paper P passes through the fixing nip portion N to the subsequent paper P reaches the fixing nip portion N. That is, regardless of the zone which is determined based on the count value which is described above, temperature of the heater 54 is controlled by using only the heating member 54*b*1** which is a heating member whose width with respect to the longitudinal direction is long.

[Control Sequence for Supplying Power to the Heating Members]

Figure 7:
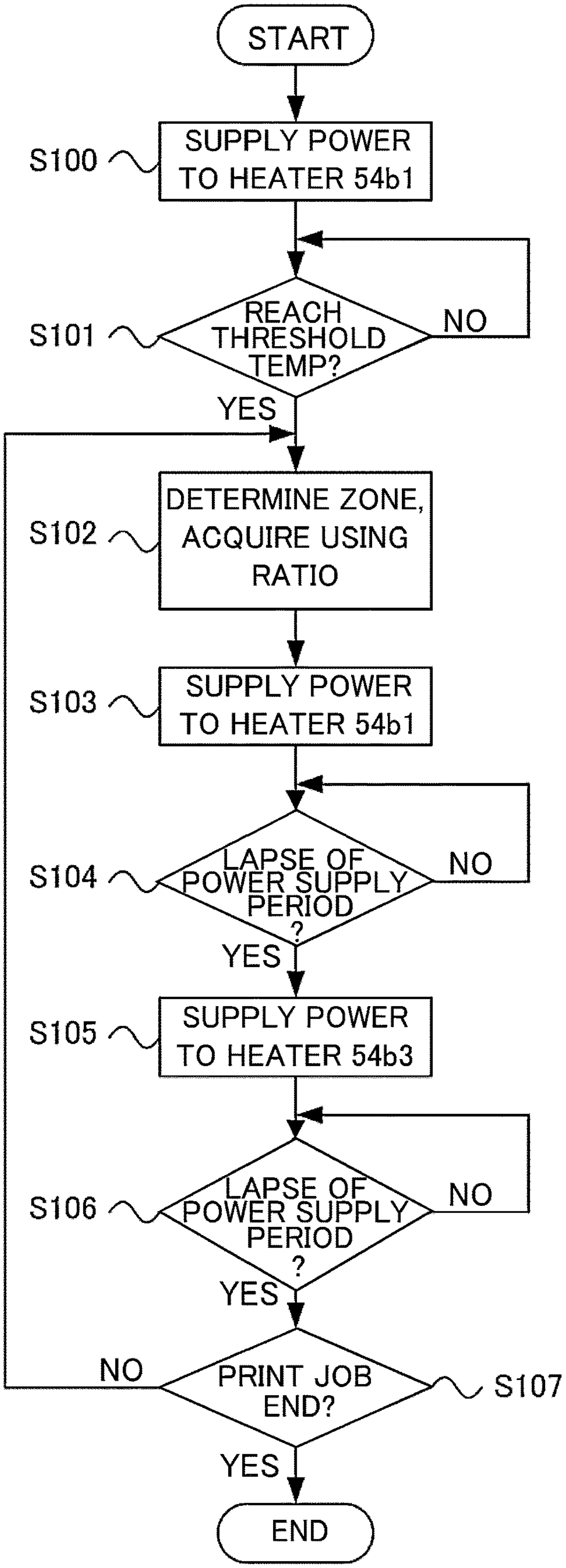
FIG. 7 is a flowchart showing a control sequence of power supply to heating members in the first embodiment.

FIG. 7 is a flowchart showing a control sequence for performing power supply to the heating members **54*b*1 and 54*b*3 when a print job is executed to print the A5 size paper P. A process in FIG. 7 is launched when a print job is started and executed by the CPU 94. Power supply periods to the heating members 54*b*1 and 54*b*3 are determined based on the usage ratio (which is also the power supply ratio) of the heating members 54*b*1 and 54*b*3** according to the zones which corresponds to the count values which are shown in Table 1 described above. Incidentally, updating of the count value which determines the zone is performed in a separate process.

When a print job is started, in step (hereinafter referred to as S) 100, the CPU 94 starts power supply to the heating member **54*b*1 based on PI control (first control). In detail, the CPU 94 turns on the triac 56*a* and turns off the triac 56*b*, and power supply is performed from the AC power supply 55 to the heating member 54*b*1. In S101, the CPU 94 receives temperature information of the heater 54 from the fixing temperature sensor 59 and determine whether the temperature of the heater 54 reaches a threshold temperature which starts switching control (second control) of the heating members. In a case that the CPU 94 determines that the temperature of the heater 54 reaches the threshold temperature, the CPU 94 proceeds with the process to S102, and in a case that the CPU 94 determines that the temperature of the heater 54 does not reach the threshold temperature, the CPU 94 returns the process to S101**.

In S102, the CPU 94 determines the zone based on the count value and receive the usage ratio (which is also a power supply period ratio) of the heating members **54*b*1 and 54*b*3 in the zone which is determined by Table 1. In S103, the CPU 94 starts power supply to the heating member 54*b*1 based on PI control, and also resets and starts the timer. In S104, the CPU 94 refers to the timer and determines whether the power supply period to the heating member 54*b*1 is passed. In a case that the CPU 94 determines the power supply period to the heating member 54*b*1 is passed, the CPU 94 proceeds with the process to S105, and in a case that the CPU 94 determines the power supply period to the heating member 54*b*1 is not passed, the CPU 94 returns the process to S104**.

In S105, the CPU 94 starts power supply to the heating member **54*b*3 based on PI control. In detail, the CPU 94 turns off the triac 56*a*, turns on the triac 56*b* and switches the heating member switching device 57 so that the contact point 54*d*3 of the heater 54 is connected to the AC power supply 55, and then, power supply from the AC power supply 55 to the heating member 54*b*3 is performed. Furthermore, the CPU 94 resets and starts the timer. In S106, the CPU 94 refers to the timer and determines whether the power supply period to the heating member 54*b*3 is passed. In a case that the CPU 94 determines the power supply period to the heating member 54*b*3 is passed, the CPU 94 proceeds with the process to S107, and in a case that the CPU 94 determines the power supply period to the heating member 54*b*3 is not passed, the CPU 94 returns the process to S106. In S107, the CPU 94 determines whether the print job is completed. In a case that the CPU 94 determines that the print job is completed, it terminates the process, and in a case that the CPU 94 determines that the print job is not completed, the CPU 94 returns the process to S102**.

[Timing of Start of Switching of the Heating Members]

(In a Case that the Power Source Voltage is 120V)

Figure 8:
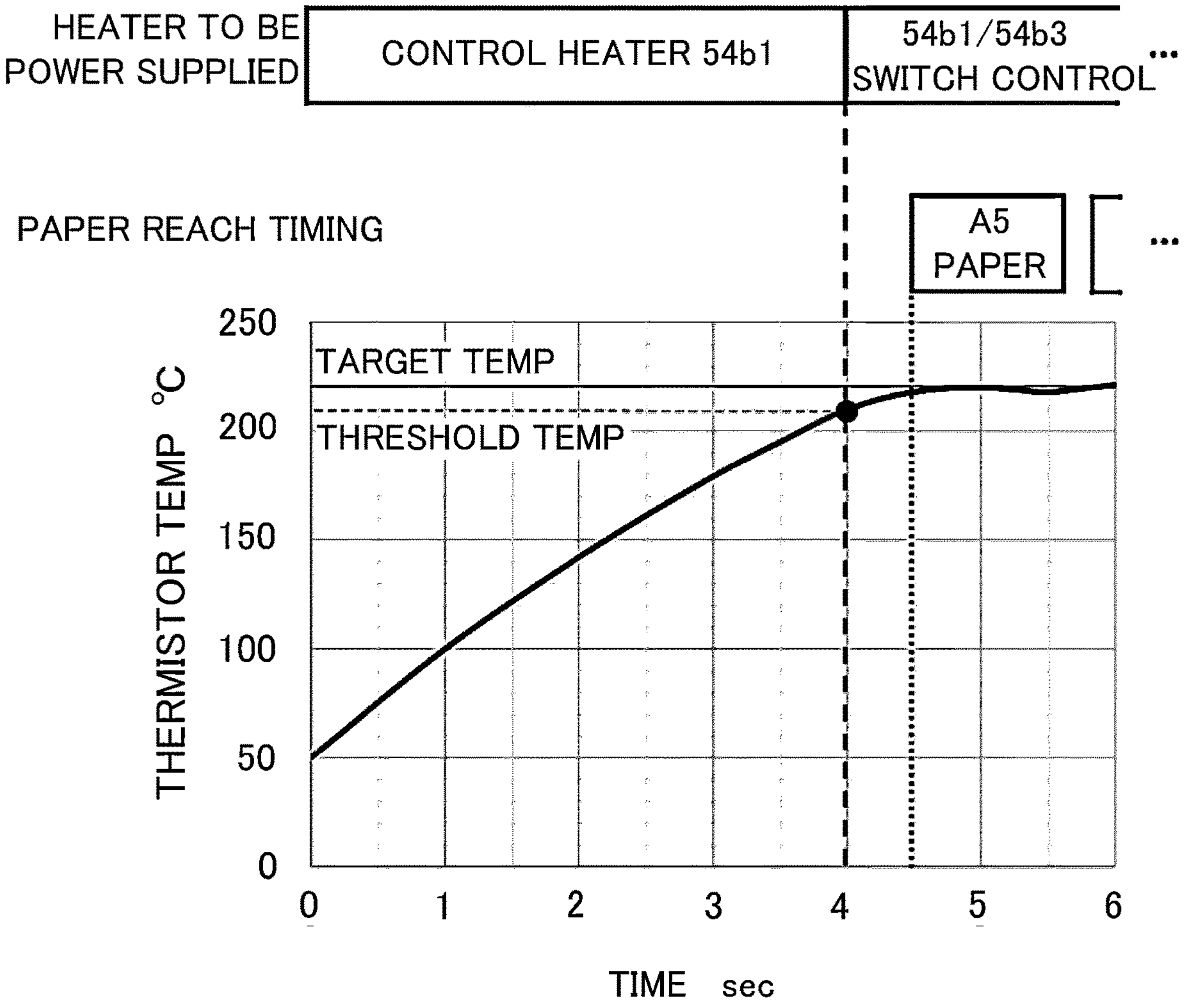
FIG. 8 is a diagram illustrating timing of start of switching of the heating members in the first embodiment.

Next, a timing of start of switching of the heating members during paper passage in the embodiment. FIG. 8 is a diagram illustrating a relationship between the heating members in which power supply is performed at the power source voltage of 120V and a detection temperature of the fixing temperature sensor 59 during printing of the A5 size paper P in the zone 4. In FIG. 8, in order from a top, the heating members to which power is supplied (indicated as the heating members to which power is supplied in the figure), and a timing when the A5 size paper P reaches at the fixing nip portion N (indicated as a timing of paper arriving in the figure) are shown. Furthermore, a graph which is shown at a bottom of FIG. 8 shows temperature change of the heater 54 which is detected by the fixing temperature sensor 59 after a start of printing operation of the image forming apparatus. A vertical axis of the graph in FIG. 8 shows the temperature of the heater 54 which is detected by the fixing temperature sensor 59 (indicated as a thermistor detection temperature in the figure) (unit: ° C.), and a horizontal axis shows an elapsed time after a start of printing operation (unit: sec).

The target temperature of the heater 54 in the embodiment is 220° C., as shown in the graph in FIG. 8. Further, the threshold temperature (indicated as a thermistor threshold temperature in the graph) of the heater 54 which starts a switching control of the heating members **54*b*1 and 54*b*3 is 210° C. In the following, the threshold temperature of the heater 54 which starts the switching control of the heating member is referred to as a thermistor threshold temperature or the threshold temperature. The threshold temperature is determined experimentally based on temperature rise in the paper non-passage area of the heater 54 and its tracking condition to the target temperature, as will be described below. When the timing to start switching control of the heating member is delayed, the fixing film 51 may be deformed in a case that temperature rise in the paper non-passage area of the fixing nip portion N occurs and the temperature rise in the paper non-passage area of the fixing nip portion N is significant. Therefore, it is necessary to adjust the timing of switching the heating members to keep the temperature of the heater 54 low enough to allow enough margin for the temperature of the paper non-passage area of the fixing nip portion N in which the fixing film 51 is deformed. Further, when the timing to start switching control of the heating members is early, the timing of tracking to the target temperature of the heater 54 may be delayed due to reduction of the maximum amount of power which is possible to supply to the heating member 54*b*1. Therefore, it is necessary to adjust the timing of switching the heating members in a range of that the timing for the heater 54 to reach the target temperature is not too late. Further, the warmer the heater 54 of the fixing device 50 is, the easier it is for the paper non-passage area of the fixing nip portion N to rise in temperature, so the timing for tracking to the target temperature is earlier. Therefore, in this case, it is preferable that the thermistor threshold temperature of the heater 54** is low. In the embodiment, the thermistor threshold temperature varies depending on the zone, which is determined based on the count value, and the greater the zone number, the lower the thermistor threshold temperature is set.

In the embodiment, the heater 54 is heated by the heating member **54*b*1 whose length is long with respect to the longitudinal direction and, after detecting the fixing temperature sensor 59 detects that the temperature of the heater 54 has reached the threshold temperature, a control in which the heating member 54*b*1 and the heating member 54*b*3 whose length is short with respect to the longitudinal direction are alternately switched, is performed. First, a warmup operation to heat the fixing device 50 is started at a same time as the printing operation is started. Specifically, as the start of the printing operation, the power supply to the heating member 54*b*1 and the rotating operation of the pressing roller 53 start. The CPU 94 performs the power supply to the heating member 54*b*1 so that temperature detected by the fixing temperature sensor 59 quickly approaches the target temperature (first control). As shown in a graph in FIG. 8, four seconds after the start of the power supply, the detected temperature of the fixing temperature sensor 59 reaches the threshold temperature of 210° C., and a control which switches the heating member 54*b*1 and the heating member 54*b*3 alternately is started (second control). Incidentally, a leading edge of the A5 size paper P enters the fixing nip portion N 4.5 seconds after the start of the power supply. As described above, in a case of the power source voltage of the AC power source 55 is 120V, the maximum average power when the power supply is performed by using only the heating member 54*b*1 is 1346 W, and the maximum average power when controlling by switching the heating member 54*b*1 and the heating member 54*b*3 in the zone 4 is 748 W. Therefore, the maximum amount of power which is supplied to the heater 54 is reduced when changing from the control which uses only the heating member 54*b*1 to the switching control which uses the heating member 54*b*1 and the heating member 54*b*3. However, in the embodiment, the heater 54 is heated sufficiently, in a condition that the maximum amount of power which is able to supply is large, until the detected temperature of the fixing temperature sensor 59 reaches the threshold temperature, and then the control in which the power supply is performed by switching the heating member 54*b*1 and the heating member 54*b*3 starts. Therefore, the temperature of the heater 54 does not decrease even after the maximum amount of power is reduced, the temperature in the center portion of the heater 54 with respect to the longitudinal direction tracks the target temperature, and image defects due to insufficient temperature of the fixing device 50** are not occurred.

(In a Case that the Power Source Voltage is 110 V)

Figure 9:
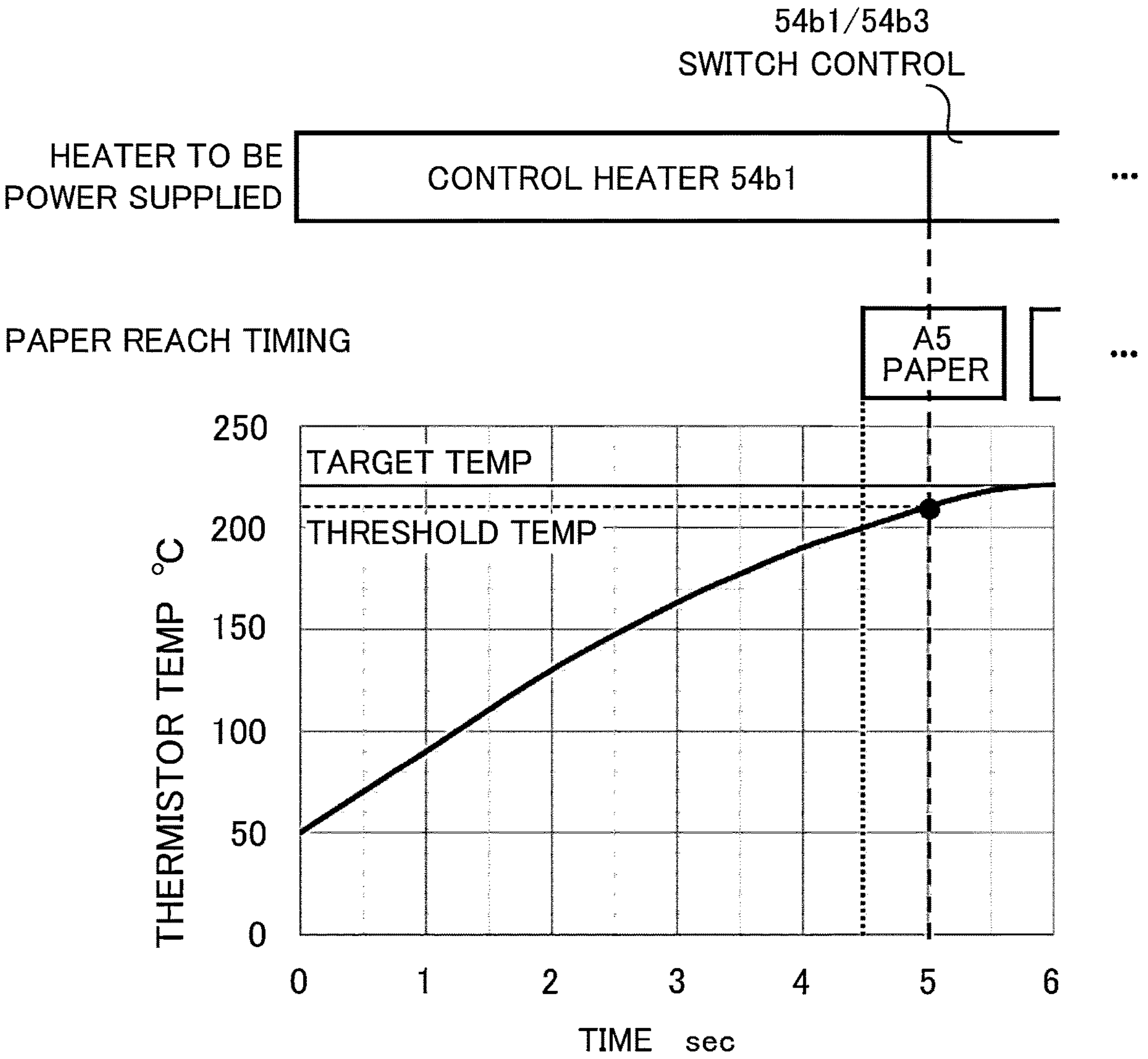
FIG. 9 is a diagram illustrating the timing of start of switching of the heating members in the first embodiment.

Next, a printing operation in a case that the power source voltage is low will be described by using FIG. 9. FIG. 9 is a diagram illustrating a relationship between the heating member in which the power supply is performed in a case that the power supply is 110V and the detected temperature of the fixing temperature sensor 59 when the A5 size paper P in the zone 4 is printed. FIG. 9 is a diagram which is a similar constitution of FIG. 8, and an explanation of a view of the figure is omitted. Incidentally, the target temperature of the heater 54 is 220° C., which is same as in FIG. 8. Further, the threshold temperature of the heater 54 (described as a thermistor threshold temperature in the graph) which starts the switching control of the heating members **54*b*1 and 54*b*3** is 210° C.

In the case that the power source voltage is 110V, as well as in the case that the power source voltage is 120V, first of all, the power supply from the AC power source 55 to the heating member **54*b*1 and the rotational operation of the pressing roller 53 are started at a same time as a start of printing operation. Compared to FIG. 8 in which the power source voltage is 120V, in a graph in FIG. 9 in the case that the power source voltage is 110V, the detected temperature of the fixing temperature sensor 59 increases slowly. The detected temperature of the heater 54 of the fixing temperature sensor 59 (thermistor detected temperature) is 201° C. at 4.5 seconds from the start of the printing operation when the A5 size paper P enters the fixing nip portion N, and has not reached at 210° C. which is the thermistor threshold temperature. Five seconds after the start of the printing operation, the detected temperature of the heater 54 by the fixing temperature sensor 59 reaches the thermistor threshold temperature of 210° C., and the control of the power supply which switches the heating member 54*b*1 and the heating member 54*b*3** is started.

As shown in Table 1, in the case that the power source voltage is 110V, the maximum average power is 1131 W when the control of the power supply is performed by using only the heating member **54*b*1. On the other hand, in a case that the control of the power supply is performed by switching the heating member 54*b*1 and the heating member 54*b*3 in the zone 4, the maximum average power is 628 W. In a case of being changed from the control which uses only the heating member 54*b*1 to switching control which uses the heating member 54*b*1 and the heating member 54*b*3, the maximum amount of power which is supplied to the heater 54 is reduced. However, in the embodiment, the heater 54 is heated sufficiently until the detected temperature of the heater 54 by the fixing temperature sensor 59 reaches the threshold temperature, and the control of the power supply is performed to switch between the heating member 54*b*1 and the heating member 54*b*3. Therefore, even after the maximum amount of power is reduced, the temperature of the heater 54 does not decrease, the temperature in the center portion of the heater 54 with respect to the longitudinal direction tracks the target temperature, and the image defects due to insufficient temperature of the fixing device 50** are not occurred. Further, temperature rise, in the paper non-passage area of the fixing nip portion N with respect to the longitudinal direction through which the A5 size paper P does not pass, is kept within a certain range, and image defects at edge portions of the A5 size paper P due to excessive heat are not occurred.

As described above, according to the embodiment, it is possible to switch the power supply to the heater from the control in which power is supplied to one heating member to the control in which power is supplied to a plurality of the heating members alternately, based on the detected temperature according to a condition of the fixing device.

Second Embodiment

In the first embodiment, when the detected temperature of the heater by the fixing temperature sensor reached the threshold temperature, the switching control of the power supply to the heating member is started. In a second embodiment, an embodiment, in which the switching control of the power supply to the heating member is started when the detected temperature of the heater by the fixing temperature sensor achieves the threshold temperature and a leading edge of the paper reaches the fixing nip portion, will be described. Incidentally, constitutions of the image forming apparatus and the fixing device 50 are similar to the first embodiment, same reference numerals in the first embodiment are used for the same devices and members, and descriptions are omitted.

[Control Sequence for the Power Supply to the Heating Members]

Figure 10:
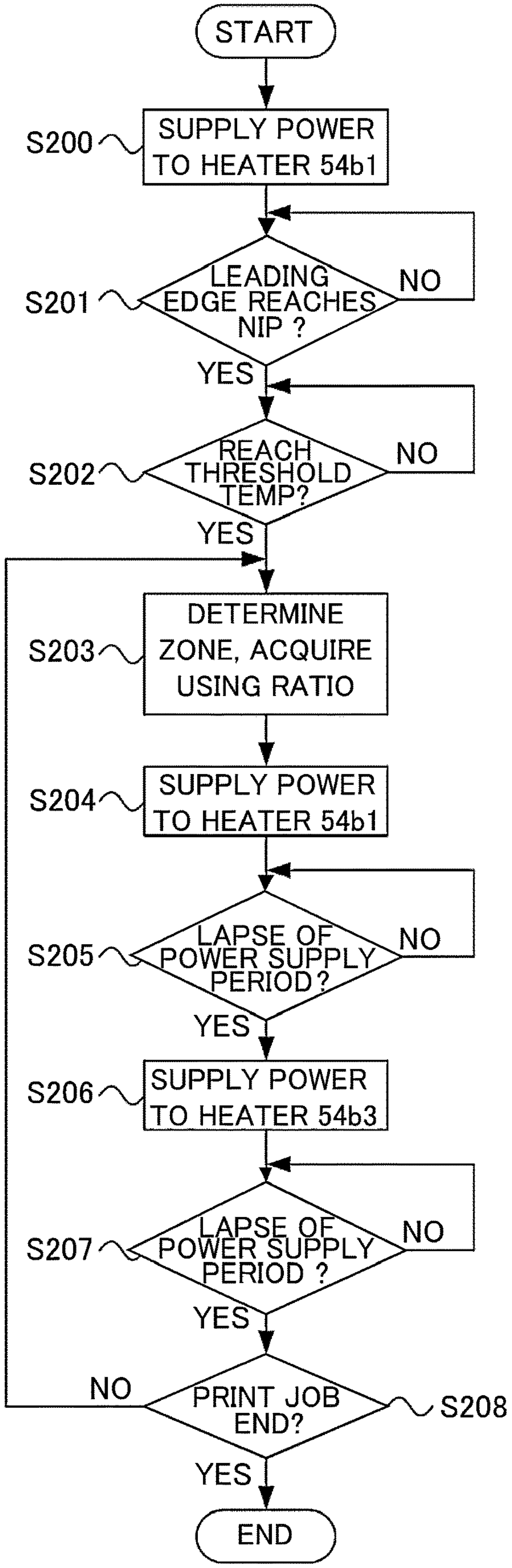
FIG. 10 is a flowchart showing the control sequence of the power supply to heating members in the second embodiment 2.

FIG. 10 is a flowchart showing a control sequence for performing the power supply to the heating members **54*b*1 and 54*b*3 when executing the print job which prints the A5 size paper P. A process which is shown in FIG. 10 is launched when a print job is started and executed by the CPU 94. The power supply periods to the heating members 54*b*1 and 54*b*3 are determined based on the usage ratio (which is also the power supply ratio) of the heating members 54*b*1 and 54*b*3** according to the zones which corresponds to the count values which are shown in Table 1 described above. Incidentally, updating of the count value which determines the zone is performed in a separate process.

A process of S200 is similar to a process of S100 in FIG. 7 of the first embodiment, and a description is omitted here. In S201, the CPU 94 determines whether the leading edge of the A5 size paper P reaches the fixing nip portion N. In the embodiment, the CPU 94 calculates a time required for the paper P to reach the fixing nip portion N based on a distance of a feeding passage from the cassette 16 to the fixing nip portion N and a feeding speed of the paper P, and also reset and start the timer. And the CPU 94 determines whether or not the paper P reaches the fixing nip portion N by whether or not the required time is elapsed with reference to the timer. Incidentally, the distance of the feeding passage from the cassette 16 to the fixing nip portion N and the feeding speed of the paper P is stored in the memory 95 in advance. In a case that the CPU 94 determines that the required time is elapsed by referring to the timer, the CPU 94 determines that the paper P reaches the fixing nip portion N and proceeds the process to S202. On the other hand, in a case that the CPU 94 determines that the required time is not elapsed, the CPU 94 determines that the paper P does not reach the fixing nip portion N and returns the process to S201. Processes from S202 through S208 are similar to the processes from S101 through S107 in FIG. 7 of the first embodiment, and a description is omitted here. Incidentally, the order of the processes S201 and S202 may be reversed.

[Timing of Starting of Switching of Heating Members]

Figure 11:
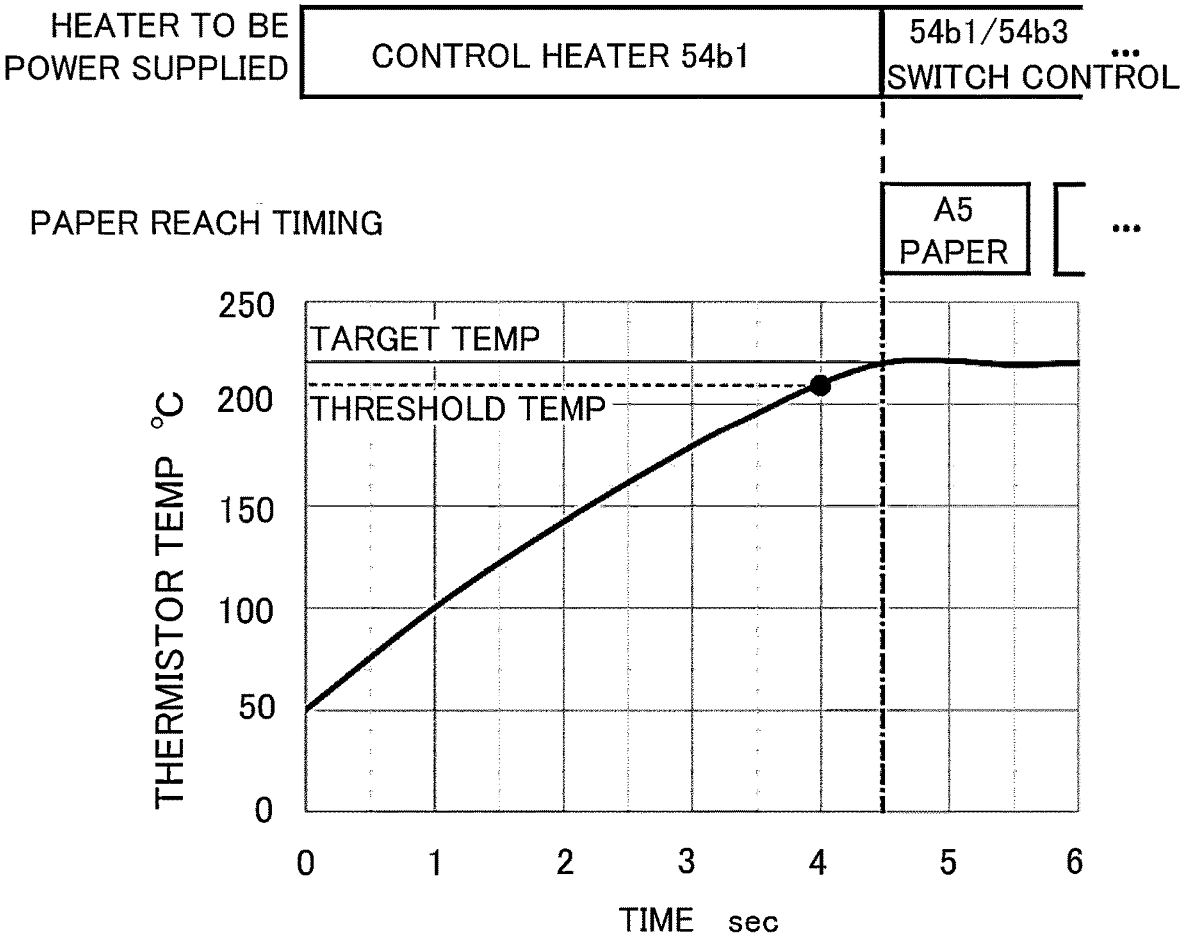
FIG. 11 is a diagram illustrating the timing of start of switching of the heating members in the second embodiment.

Next, a timing of starting of the switching of heating members when paper is passed through in the embodiment will be described. FIG. 11 is a diagram illustrating a relationship between the heating member in which the power supply is performed at a power source voltage of 120V and the detected temperature by the fixing temperature sensor 59 during printing of the A5 size paper P in the zone 4. FIG. 11 is the diagram which is a similar constitution of FIG. 8, and an explanation of a view of the figure is omitted. Incidentally, the target temperature of the heater 54 is 220° C., which is same as in the first embodiment. Further, the threshold temperature of the heater 54 (described as a thermistor threshold temperature in the graph) which starts the switching control of the heating members **54*b*1 and 54*b*3** is 210° C.

In the embodiment, the heater 54 is heated by the heating member **54*b*1 whose length is long with respect to the longitudinal direction and, after the fixing temperature sensor 59 detects that the temperature of the heater 54 has reached the threshold temperature, a control in which the heating member 54*b*1 and the heating member 54*b*3 whose length is short with respect to the longitudinal direction are alternately switched, is performed. First, a warmup operation to heat the fixing device 50 is started at a same time as the printing operation is started. Specifically, as the start of the printing operation, the power supply to the heating member 54*b*1 and the rotating operation of the pressing roller 53 start. As shown in a graph of FIG. 11, four seconds after the start of the printing operation, the detected temperature (the thermistor detection temperature) of the heater 54 by the fixing temperature sensor 59 reaches at 210° C. which is the thermistor threshold temperature. And 4.5 seconds after the start of printing operation, the leading edge of the A5 size paper P reaches the fixing nip portion N, and the control of switching the power supply of the heating member 54*b*1 and the heating member 54*b*3 alternately is started. In this way, in the second embodiment, unlike the first embodiment, even when the detected temperature of the heater 54 by the fixing temperature sensor 59** reaches the thermistor threshold temperature, the heating member switching control does not start until the A5 size paper P reaches the fixing nip portion N.

As described above, when the switching control of the heating members is performed while the paper P is not passing through the fixing nip portion N, the temperature in the end portion of the fixing nip portion N with respect to the longitudinal direction decreases compared to the center portion of the fixing nip portion N with respect to the longitudinal direction. Further, when the switching control of the heating members is started, the maximum amount of power which is possible to supply to the heater 54 is decreased, so the timing of reaching the target temperature of the heater 54 may be delayed. In the embodiment, during the warmup of the fixing device 50, the power supply switching control to the heating members is started after the paper P reaches the fixing nip portion N, so it is possible to prevent from decreasing the temperature in the end portions of the heater 54 with respect to the longitudinal direction. Further, a condition, that the maximum amount of power which is possible to supply to the heater 54 is large, is maintained for a longer period of time, so the timing that the heater 54 reaches the target temperature is earlier. Further, in a case that the power source voltage is as low as 110V and the temperature of the heater 54 does not reached the thermistor threshold temperature when the leading edge of the paper P reaches the fixing nip portion N, same control may be performed as described by using FIG. 9 in the first embodiment. Therefore, the temperature decrease in the center portion of the heater 54 with respect to the longitudinal direction is suppressed, the temperature rise at the edge portion with respect to the longitudinal direction also falls within a certain range, and image defects are not occurred at the edge portions of the A5 size paper P due to excessive heat. In the embodiment, in addition to the effects of the first embodiment, it is possible to prevent the temperature decrease in the end portions of the fixing nip portion N with respect to the longitudinal direction during the warmup of the fixing device 50 and the timing of reaching the target temperature during the warmup is also possible to be earlier.

As described above, according to the embodiment, it is possible to switch the power supply to the heater from the control in which power is supplied to one heating member to the control in which power is supplied to the plurality of the heating members alternately, based on the detected temperature according to the condition of the fixing device.

Third Embodiment

In a third embodiment, an embodiment, in which the temperature control of the fixing device is precisely controlled by correcting the threshold temperature (which is also referred to as the thermistor threshold temperature) at which the switching control of the heating members is started according to an environmental temperature and the power source voltage of the image forming apparatus and basis weight of the paper which is used, will be described.

[Control Block of the Image Forming Apparatus]

Figure 12:
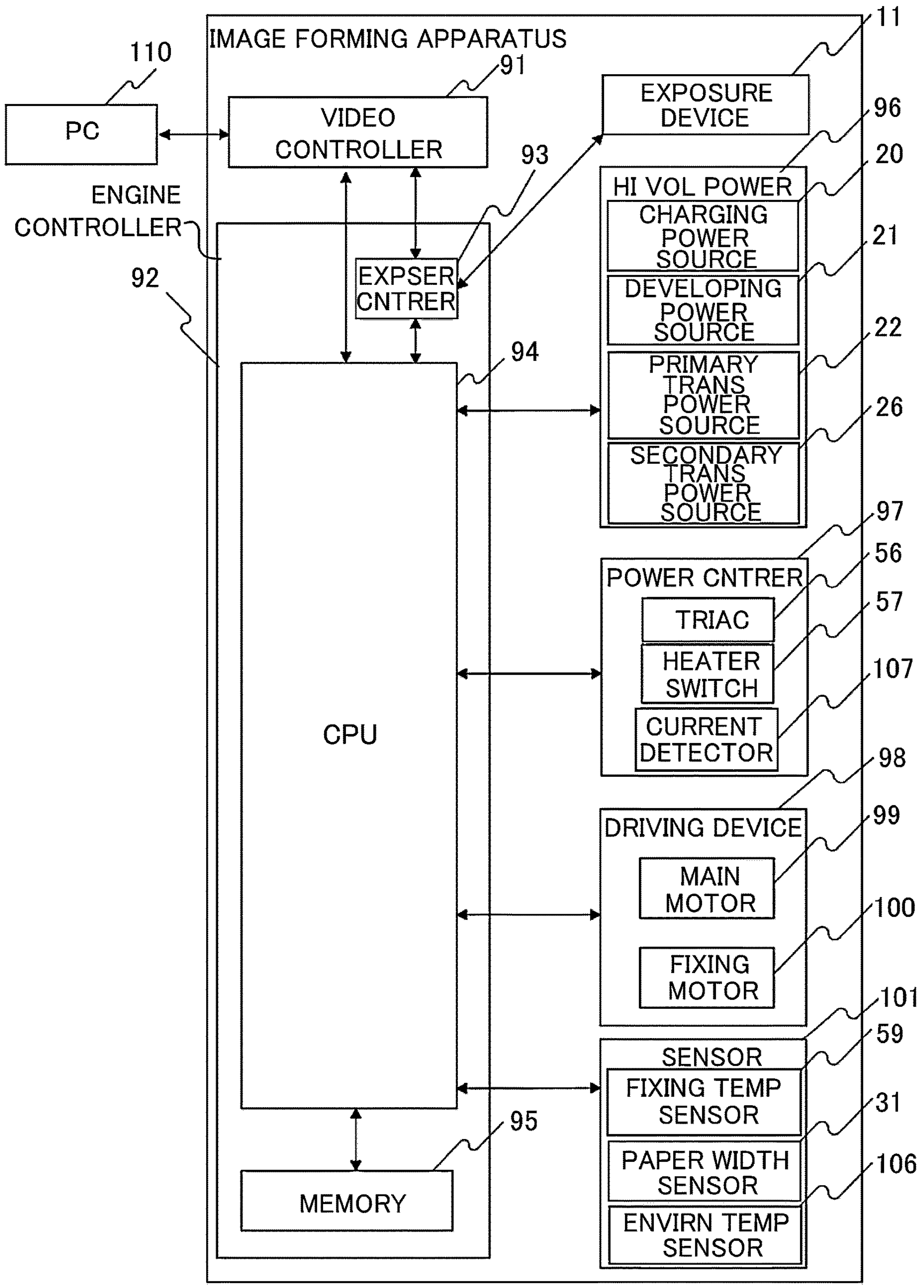
FIG. 12 is a block diagram showing a constitution of the control portion of the image forming apparatus in the third embodiment and the fourth embodiment.

FIG. 12 is a block diagram showing a constitution of a control portion in the image forming apparatus of the embodiment. In FIG. 12, compared to FIG. 2 in the first embodiment, an environmental temperature sensor 106 and an electric current detecting circuit 107 are added. Other members and devices are same as those which are shown in FIG. 2 of the first embodiment, and descriptions in here are omitted by using same reference numerals for the same members and devices.

The environmental temperature sensor 106, which is a second temperature detecting unit, is provided at a position in which it is not affected by heat which is generated by the heater 54 of the fixing device 50, detects ambient temperature of the image forming apparatus (hereinafter referred to as "environmental temperature"), and outputs detected environmental temperature to the CPU 94. Further, the fixing power control device 97 includes the electric current detecting circuit 107. The electric current detecting circuit 107 detects electric current which is supplied from the AC power source 55 to the heater 54 of the fixing device 50 and outputs the detected electric current value to the CPU 94.

[Power Control Circuit]

Figure 13:
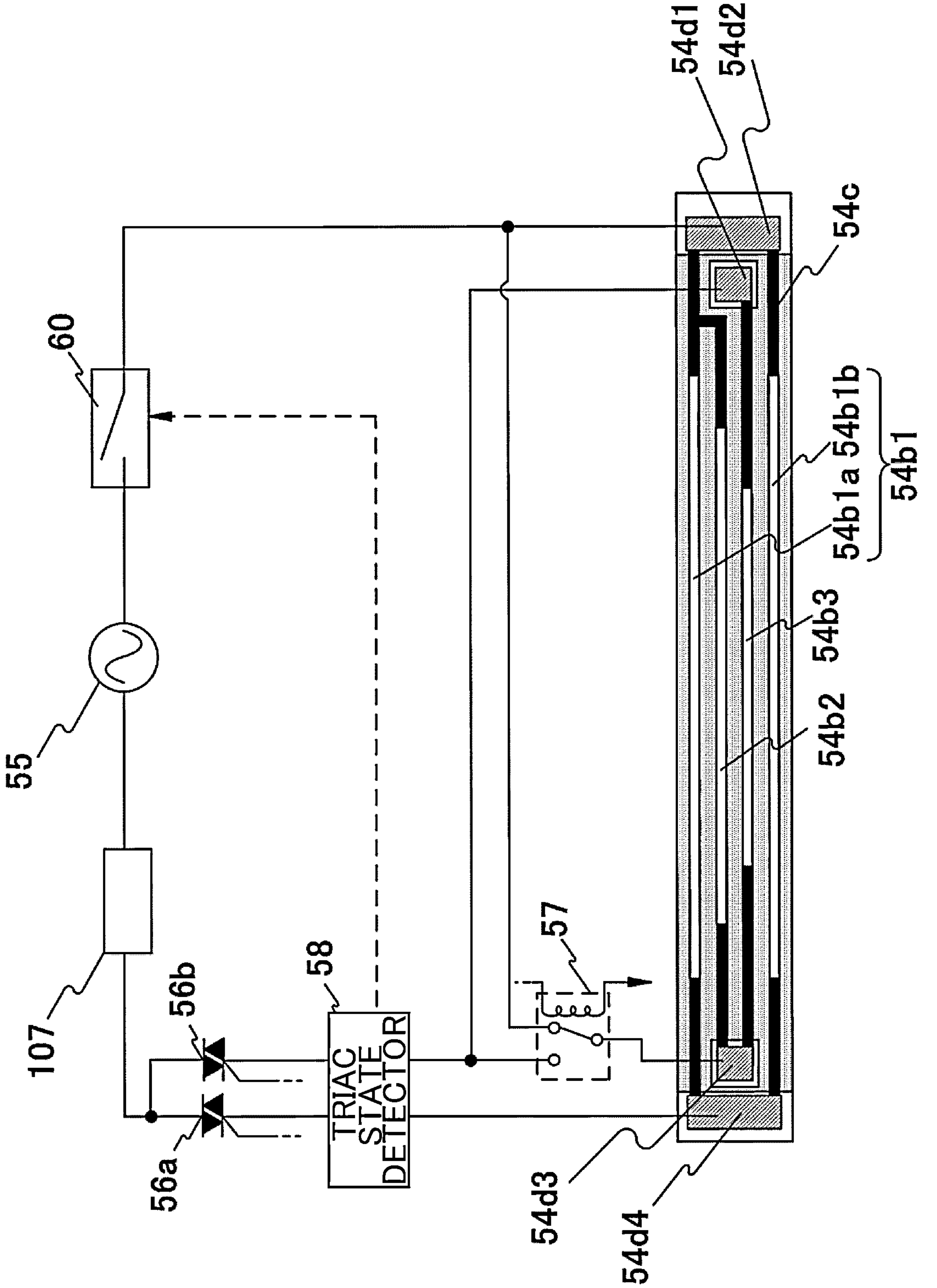
FIG. 13 is a schematic diagram showing a constitution of the power control circuit of the fixing device in the third embodiment and the fourth embodiment.

FIG. 13 is a schematic diagram showing a constitution of the power control circuit of the fixing device 50 in the embodiment. FIG. 13 is different from FIG. 6 in the first embodiment in that the electric current detecting circuit 107 is added. Other circuits and members which are shown in FIG. 13 are same as those shown in FIG. 6 of the first embodiment, and descriptions are omitted by using same reference numerals for same circuits and members. The electric current detecting circuit 107 is provided in an electric current passage between the AC power source 55 and the triacs **56*a* and 56*b*, and detects electric current value which is supplied to the heating members of the heater 54 in the fixing device 50. The electric current detecting circuit 107 outputs a detected result of the current value to the CPU 94**.

[Calculation of the Power Source Voltage]

Figure 14:
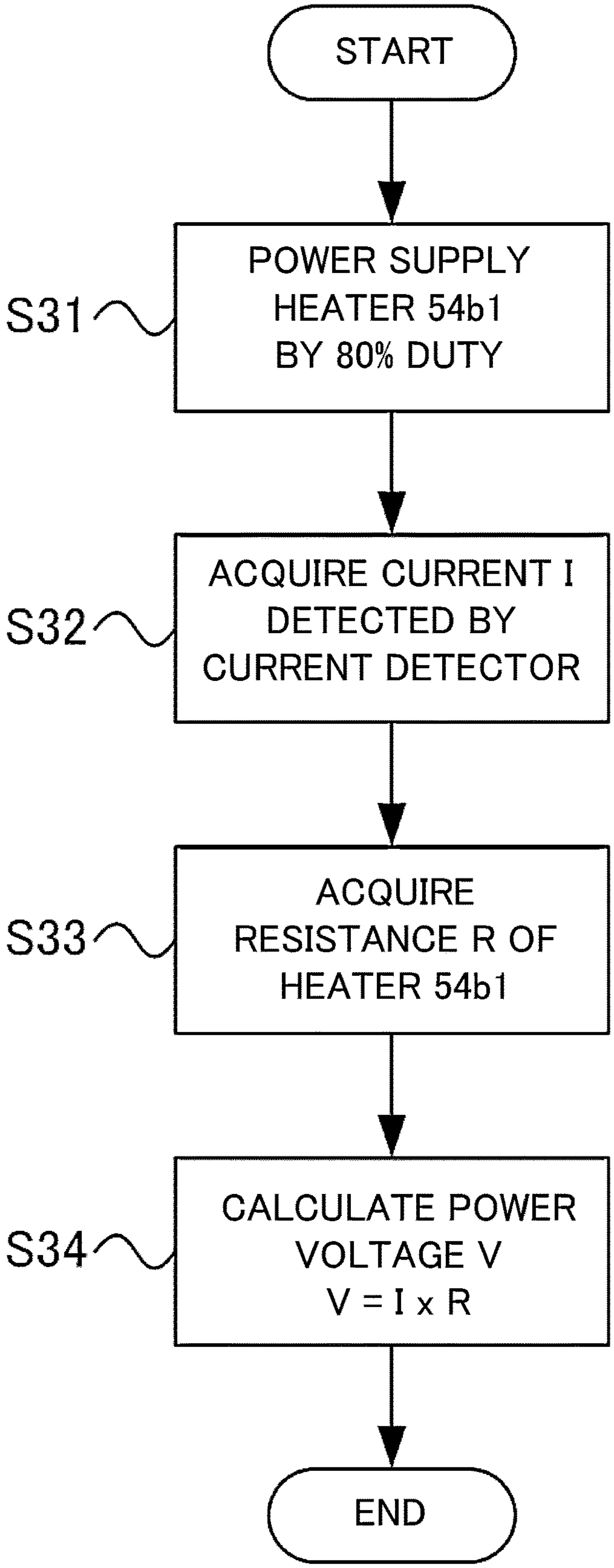
FIG. 14 is a flowchart showing a voltage calculation sequence in the third embodiment and the fourth embodiment.

The CPU 94 calculates the power source voltage, which is value of AC voltage which is supplied from the AC power source 55, based on the electric current value which is obtained from the electric current detecting circuit 107. FIG. 14 is a flowchart showing a voltage calculation sequence in which the CPU 94 calculates the power source voltage. A process in FIG. 14 is started when a power source of the image forming apparatus is turned on and is executed by the CPU 94. Incidentally, the memory 95 stores a resistance value of the heating member **54*b*1** which is measured in advance.

When the power source of the image forming apparatus is turned on, the power supply is performed to the fixing device 50, and an operation of rotating the pressing roller 53 (pre multiple rotation) is performed. In S31, the CPU 94 turns on the triac **56*a* and turns off the triac 56*b* during pre multiple rotation, and the power supply is performed from the AC power source 55 to the heating member 54*b*1 at 80% of a duty cycle. In S32, the CPU 94 obtains an electric current value I which is output from the AC power source 55, from the electric current detecting circuit 107. In S33, the CPU 94 obtains a resistance value R of the heating member 54*b*1 from the memory 95. In S34, the CPU 94 calculates the power source voltage V (=the electric current value I×the resistance value R) which is supplied from the AC power source 55 by using the electric current value I which is obtained in S32 and the resistance value R which is obtained in S33, stores the calculated power source voltage V in the memory 95, and finishes the process. Incidentally, in the embodiment, the power source voltage is obtained based on the electric current value I and the resistance value R which are measured, however, for example, the power source voltage may be estimated by a state of temperature rise of the heater 54 which is detected by the fixing temperature sensor 59 with respect to the amount of power which is supplied to the heater 54**.

[Correction of the Thermistor Threshold Temperature]

In the embodiment, in order to precisely control the temperature of the fixing device 50, the threshold temperature (thermistor threshold temperature) at which the switching control of the heating members is started is corrected according to the environmental temperature and the power source voltage of the image forming apparatus and the basis weight of the paper which is used. Here, the thermistor threshold temperature at which the switching control of the heating members which are described in the first embodiment and the second embodiment is started is a reference thermistor threshold temperature Ta (unit: ° C.), and an amount of correction of correcting the reference thermistor threshold temperature Ta is an amount of thermistor threshold correction Tb (unit: ° C.). And when the thermistor threshold temperature after correction is a thermistor threshold temperature Ts (unit: ° C.), the thermistor threshold temperature Ts in the embodiment is described as a following (equation 1).

$$\text{Thermistor threshold temperature } Ts = \text{Reference thermistor threshold temperature } Ta + \text{The amount of thermistor threshold correction } Tb \quad \text{(equation 1)}$$

The reference thermistor threshold temperature Ta is determined by the environmental temperature T (unit: ° C.) which is detected by the environmental temperature sensor 106 and the power source voltage V (unit: V) which is calculated by the voltage calculation sequence which is described above and is described as a following (equation 2).

$$\text{Reference thermistor threshold temperature } Ta = 220 - (\text{Environmental Temperature } T - 23) - (\text{Power supply voltage } V - 120)/2 \quad \text{(equation 2)}$$

As described above, the higher the environmental temperature T is above a predetermined temperature (23° C.), the lower the reference thermistor threshold temperature Ta is. This is because the higher the environmental temperature T is above the predetermined temperature (23° C.), the more allowance there is for the temperature decrease in the center portion of the heater 54 with respect to the longitudinal direction. Further, the higher the power source voltage V is above a predetermined voltage (120 V), the lower the reference thermistor threshold temperature Ta is. Because the higher the power source voltage V is than the predetermined voltage (120 V), the higher the maximum amount of power which is supplied to the heater 54, and the temperature in the center portion of the heater 54 with respect to the longitudinal direction is not easily decreased even when the switching control of the heating members is started at a lower temperature.

Further, the amount of thermistor threshold correction Tb changes depending on the basis weight (weight per unit area) of the paper P. Table 2 is a table showing a relationship between the basis weight X of the paper P and the amount of the thermistor threshold correction Tb, and the amount of the thermistor threshold correction Tb (unit: ° C.) according to the basis weight X of the paper P (unit: g/$m^2$) is shown.

TABLE 2

| | | Amount of thermistor threshold correction Tb [° C.] |
|---|---|---|
| Basis weight X (g/$m^2$) | X = 60 | −5 |
| | 60 < X ≤ 75 | 0 |
| | 75 < X ≤ 90 | +5 |

As shown in Table 2, the larger the basis weight X, the larger the amount of the thermistor threshold correction Tb. Because the smaller the basis weight of the paper P is, the less heat is taken from (the fixing nip portion N of) the fixing device 50 when the paper P is passing through the fixing nip portion N. This is because the temperature in the center portion of the fixing nip portion N with respect to the longitudinal direction is not easily decreased, even when the switching control of the heating members is started at a lower temperature. A method of calculating the thermistor threshold temperature Ts in the embodiment by (equation 1) which is described above is confirmed by experimentally changing the environmental temperature T, the power source voltage V and the basis weight X of the paper P.

For example, in a case that the environmental temperature Tis 30° C., the power source voltage Vis 110V, and the basis weight of the A5 size paper P is 80 g/$m^2$, the reference thermistor threshold temperature Ta is calculated by using (equation 2) as below.

$$\text{Reference thermistor threshold temperature } Ta = 200 - (30 - 23) - (110 - 120)/2 = 218 \text{ (unit: ° C.)}$$

Further, the amount of the thermistor threshold correction Tb (unit: ° C.) is +5° C. from Table 2. Therefore, the thermistor threshold temperature Ts is calculated by (equation 1) as below.

$$\text{Thermistor threshold temperature } Ta = \text{Reference thermistor threshold temperature } Ta + \text{Amount of thermistor threshold correction } Tb = 218 + 5 = 223 \text{ (unit: ° C.)}$$

As described above, in the embodiment, the thermistor threshold temperature Ts is obtained as an absolute value, however, it may be a value relative to the target temperature of the heater 54, for example. Further, in the embodiment, the thermistor threshold temperature Ts is corrected according to the basis weight of the paper P, however, the thermistor threshold temperature Ts may be corrected based on an index which indicates other properties of the paper P such as a surface roughness of the paper P. As described above, in addition to the effects in the second embodiment which is described above, in the embodiment, the thermistor threshold temperature is finely corrected according to the environmental temperature, the power source voltage and the basis weight of the paper. Therefore, it is possible to control temperature more precisely so that temperature of the heater in the center portion with respect to the longitudinal direction is appropriate while temperature of the fixing nip portion N in the end portions with respect to the longitudinal direction is also appropriate.

As described above, according to the embodiment, it is possible to switch the power supply to the heater from the control in which power is supplied to one heating member to the control in which power is supplied to the plurality of the heating members alternately, based on the detected temperature according to the condition of the fixing device.

Fourth Embodiment

In a fourth embodiment, an embodiment in which switching control of the heating member is started, after the heater temperature reaches the threshold temperature (thermistor threshold temperature) at which the switching control of the heating member is started and a waiting time which is set according to the environmental temperature, the power source voltage and the basis weight of the paper, will be described. Incidentally, constitutions of the image forming apparatus and the fixing device 50 are similar to the third embodiment, same reference numerals in the third embodiment are used for the same devices and members, and descriptions are omitted.

[Calculation of Waiting Time]

In a case that the switching of the heating members is started immediately after the heater 54 reaches the target temperature, since a heat storage amount of the fixing device is not enough, temperature in the center portion of the fixing nip portion N with respect to the longitudinal direction decreases when the amount of average power which is supplied to the heater 54 by the switching control of the heating members decreases. As a result, image defects may occur due to insufficient heat from the heater 54. For example, in a case that the environmental temperature T of the image forming apparatus is low, an amount of heat radiation from the heater 54 is greater compared to a case that the environmental temperature T is high, so temperature may decrease in the center portion of the heater 54 with respect to the longitudinal direction. Further, in a case that the power source voltage V which is supplied from the AC power source 55 is low, since the maximum amount of power in which the AC power source 55 is able to output is low, temperature may decrease in the center portion of the heater 54 with respect to the longitudinal direction. Furthermore, in a case that the basis weight of the paper P is large, since an amount of heat in the fixing nip portion N which is taken by the paper P while the paper P is passed through the fixing nip portion Nis large, temperature may decrease in the center portion of the fixing nip portion N with respect to the longitudinal direction. In the embodiment, in a case that the environmental temperature T is low, a case that the power source voltage Vis low, or a case that the basis weight of the paper P is large, as described above, a waiting time until the switching control of the heating member after the heater 54 reaches the target temperature is set. Therefore, the fixing device 50 stores heat with a sufficient amount of power and temperature decrease in the center portion of the fixing nip portion N with respect to the longitudinal direction is suppressed.

[Calculation of Waiting Time]

Next, a method for calculating waiting time Tw from a time when the heater 54 reaches the target temperature until a time when the switching control of the heating member is started, will be described. When a reference waiting time is defined as a reference waiting time Tn (unit: second), and a correction amount to correct the reference waiting time Tn is defined as a waiting time correction amount Tm (unit: second), a waiting time Tw (unit: second) is described as a following (equation 3).

$$\text{Waiting time } Tw = \text{Reference waiting time } Tn + \text{Waiting time correction amount } Tm \quad \text{(equation 3)}$$

The reference waiting time Tn is determined by the environmental temperature T (unit: ° C.) which is detected by the environmental temperature sensor 106 and the power source voltage V (unit: V) which is calculated by the voltage calculation sequence which is described in the third embodiment and described as a following (equation 4).

$$\text{Reference waiting time } Tn = 2 - (\text{Environmental temperature } T - 23)/7 - (\text{Power source voltage V} - 120)/14 \quad \text{(Equation 4)}$$

Further, waiting time correction amount Tm is changed by the basis weight (weight per unit area) of the paper P. Table 3 is a table showing a relationship between the basis weight X of the paper P and the waiting time correction amount Tm, and the waiting time correction amount Tm (unit: second) according to the basis weight X of the paper P (unit: g/m$^2$).

TABLE 3

| | | Amount of standby time correction Tm [sec] |
|---|---|---|
| Basis weight X (g/m$^2$) | X = 60 | −0.5 |
| | 60 < X ≤ 75 | 0 |
| | 75 < X ≤ 90 | +0.5 |

Further, the waiting time Tw is limited to between 0 and 4 seconds. The calculation method of the waiting time Tw by (equation 3) which is described above, is experimentally confirmed by changing the environmental temperature, the power source voltage and the basis weight of the paper P.

For example, in a case that the environmental temperature T is 30° C., the power source voltage Vis 110V and the basis weight of the A5 size paper P is 80 g/m$^2$, the reference waiting time Tn is calculated by using (equation 4) as follows.

$$\begin{aligned}\text{Reference waiting time } Tn &= 1 - (30 - 23)/7 - (110 - 120)/14\\ &= 0.71 \text{ (second)}\end{aligned}$$

Further, the waiting time correction amount Tm (unit: second) is +0.5 seconds from Table 3. Therefore, the waiting time Tw is calculated from (equation 3).

$$\text{Waiting time } Tw = 0.71 + 0.5 = 1.21 \text{ (unit: second)}$$

[Control Sequence for the Power Supply to the Heating Members]

Figure 15:
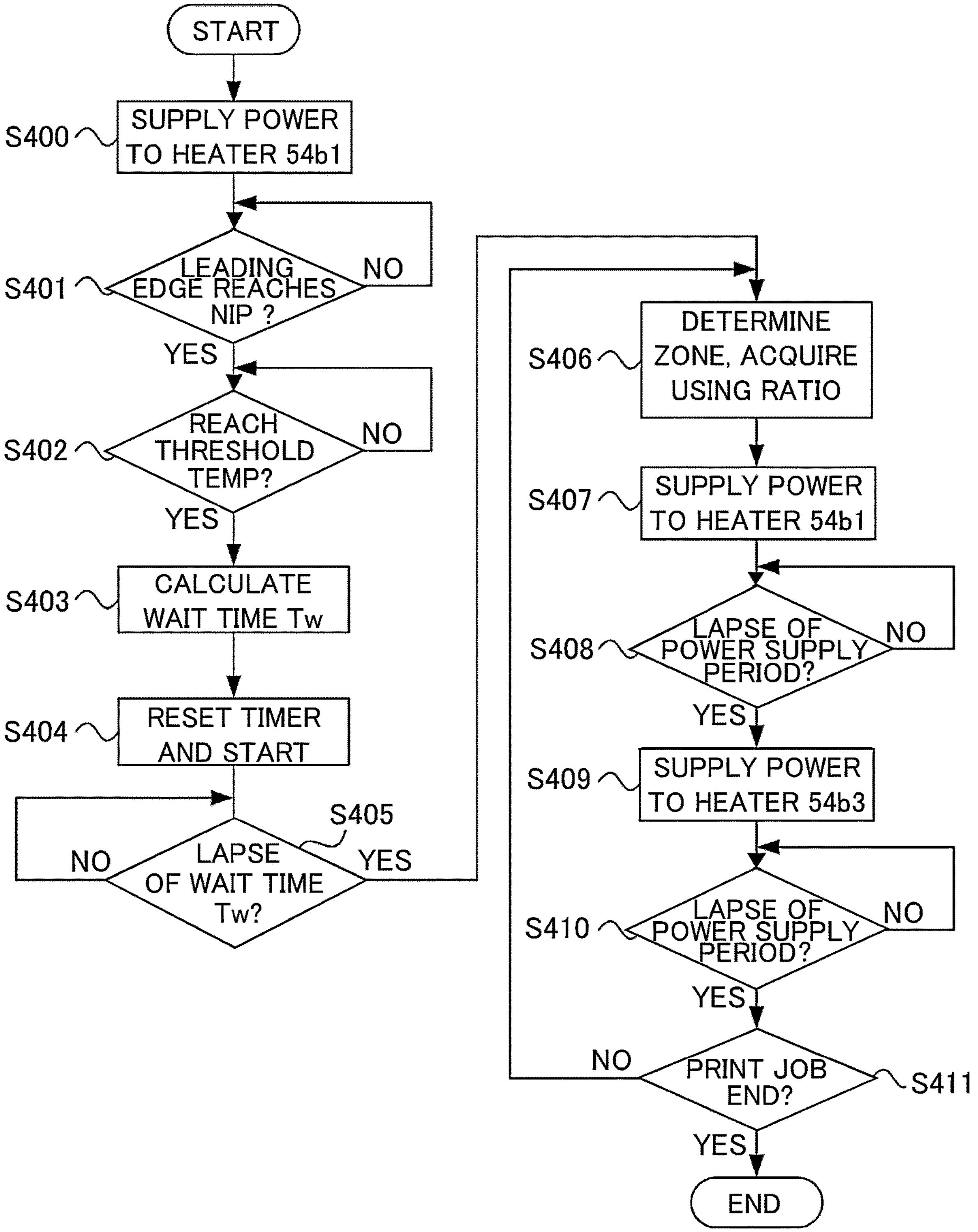
FIG. 15 is a flowchart showing the control sequence of the power supply to the heating members in the fourth embodiment.

FIG. 15 is, in the embodiment, a flowchart showing a control sequence for performing the power supply to the heating members **54*b*1 and 54*b*3 when executing the print job which prints the A5 size paper P. A process in FIG. 15 is launched when the print job is started, and is executed by the CPU 94. The power supply periods to the heating members 54*b*1 and 54*b*3 are determined based on the usage ratio (which is also the power supply ratio) of the heating members 54*b*1 and 54*b*3 according to the zones which corresponds to the count values which are shown in Table 1 described above. Incidentally, updating of the count value which determines the zone is performed in a separate process. Further, the power source voltage V, which is calculated by the voltage calculation sequence which is described in the third embodiment, is stored in the memory 95. Furthermore, data in Table 3, which is a table showing the relationship between the basis weight X of the paper P and the waiting time correction amount Tm which is described above, are stored in the memory 95. Further, the basis weight of each size of the paper P is stored in the memory 95**.

Processes from S400 to S402 are similar to processes from S200 to S202 in FIG. 10 of the second embodiment, and descriptions are omitted here. In S403, the CPU 94 calculates the waiting time Tw which is described above. In detail, the CPU 94 obtains the environmental temperature T which is detected by the environmental temperature sensor 106, obtains the power source voltage V from the memory 95 and calculates the reference waiting time Tn by using (equation 4) described above. Furthermore, the CPU 94 determines the waiting time correction amount Tm based on the data in Table 3 which is stored in the memory 95 and the basis weight of the A5 size paper P, and calculates the waiting time Tw by using (equation 3) described above.

In S404, the CPU 94 resets and starts the timer. In S405, the CPU 94 refers to the timer and determines whether the waiting time Tw is elapsed. In a case of determining that the waiting time Tw is elapsed, the CPU 94 proceeds the process to S406, and in a case of determining that the waiting time Tw is not elapsed, the CPU 94 returns the process to S405. Processes from S406 to S411 are similar to processes from S203 to S208 in FIG. 10 of the second embodiment, and descriptions are omitted here.

In this way, in addition to effects of the second embodiment, it is possible to perform the temperature control of the heater 54 accurately, by setting a waiting time until the switching control of the heating member is started after reaching the thermistor threshold temperature. Further, it is possible to perform the temperature control of the heater 54 more accurately by finely changing the waiting time according to the environmental temperature, the power source voltage and the basis weight of the paper.

As described above, according to the embodiment, it is possible to switch the power supply to the heater from the control in which power is supplied to one heating member to the control in which power is supplied to the plurality of the heating members alternately, based on the detected temperature according to the condition of the fixing device.

According to the present invention, it is possible to switch the power supply to the heater from the control in which power is supplied to one heating member to the control in which power is supplied to the plurality of the heating members alternately, based on the detected temperature according to the condition of the fixing device.

Other Embodiment(s)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-135856, filed on Aug. 23, 2021 which is hereby incorporated by reference herein in its entirety.

What is claimed is:

1. An image forming apparatus comprising:
an image forming unit configured to form an unfixed toner image on a recording material; and
a fixing unit for fixing the unfixed toner image on the recording material, wherein the fixing unit comprises:
a first rotatable member;
a heater provided, on a substrate, with a plurality of heat generating members, including a first heat generating member and a second heat generating member of which a length in a longitudinal direction is shorter than a length of the first heat generating member, and
configured to heat the first rotatable member;
a first temperature detecting unit configured to detect a temperature of the heater;
a second rotatable member configured to form a nip portion with the first rotatable member;
a switching unit configured to switch a power supply path from an AC power source to the first heat generating member or the second heat generating member;
a control unit configured to control the switching unit to supply power to the first heat generating member or the second heat generating member,
wherein when the control unit receives a print command to the recording material of which a length in a widthwise direction corresponds to the length of the second heat generating member, the control unit executes a first control in which the switching unit supplies the power only to the first heat generating member until the temperature detected by the first temperature detecting unit reaches a threshold temperature from receiving the print command, and switches a second control in which the switching unit supplies the power alternately to the first heat generating member or the second heat generating member after the temperature detected by the first temperature detecting unit reaches the threshold temperature.

2. An image forming apparatus according to claim 1, further comprising a temperature predicting unit configured to predict a temperature of the fixing device based on a count value which is increased when the recording material passes through the nip portion and is decreased with a lapse of time when the recording material does not pass through the nip portion,
wherein the threshold temperature is determined based on the count value of the temperature predicting unit.

3. An image forming apparatus according to claim 2, wherein the threshold temperature becomes lower as the count value of the temperature predicting unit becomes larger.

4. An image forming apparatus according to claim 3, wherein a time ratio supplying the power to the first heat generating member and the second heat generating member from the AC power source is determined based on the count value.

5. An image forming apparatus according to claim 1, wherein the control unit starts the second control when the temperature detected by the first temperature detecting unit reaches the threshold temperature and the recording material reaches the nip portion.

6. An image forming apparatus according to claim 1, wherein the heater provided with a third heat generating member of which a length in the longitudinal direction is shorter than the length of the second heat generating member; and a fourth heat generating member of which a length in the longitudinal direction is substantially equal to the length of the first heat generating member, and wherein the first heat generating member, the second heat generating member, the third heat generating member and the fourth heat generating member are arranged in this order with respect to a short side direction of the substrate.

7. An image forming apparatus according to claim 6, wherein the heater provided with a first contact point electrically connected to one end of the first heat generating member, the second heat generating member and the fourth heat generating member, a second contact point electrically connected to one end the third heat generating member, a third contact point electrically connected to the other ends of the second heat generating member and the third heat generating member, and a fourth contact point electrically connected to the other ends of the first heat generating member and the fourth heat generating member.

8. An image forming apparatus according to claim 7, wherein the switching unit includes a first switch, a second switch and a first relay, wherein the first switch connects or disconnects the AC power source and the fourth contact point, wherein the second switch connects or disconnects the AC power source and the first relay, and the AC power source and the second contact point, and wherein the first relay is capable of switching connection of the second switch and the third contact point, and connection of the AC power source and the third contact point.

9. An image forming apparatus according to claim 8, further comprising a detecting portion configured to detect a state of the first switch and the second switch; and a second relay configured to connect or disconnect a power supply path between the AC power source and the first contact point, wherein the detecting portion drives the second relay to disconnect the power supply path when detecting a state in which the first switch connects the AC power source and the fourth contact point and the second switch connects the AC power and the first relay.

10. An image forming apparatus according to claim 9, wherein the first switch and the second switch include a bidirectional thyristor.

11. An image forming apparatus according to claim 10, wherein the first temperature detecting unit includes a thermistor.

12. An image forming apparatus according to claim 1, wherein the first rotatable member includes a cylindrical film, wherein the second rotatable member includes a pressing roller forming the nip portion in corporation with the film, and wherein the heater is arranged in an internal space of the film, the heater and the pressing roller nips the film, and the image on the recording material is heated at the nip portion via the film.

13. An image forming apparatus according to claim 1, further comprising a current detecting unit configured to detect a current supplied to the fixing device from the AC power source, wherein the threshold temperature is corrected based on a power supply voltage calculated based on a current value detected by the current detecting unit.

14. An image forming apparatus according to claim 1, wherein the threshold temperature is corrected to be higher in a case that the power supply voltage is lower than a predetermined voltage and to be lower in a case that the power supply voltage is higher than the predetermined voltage.

15. An image forming apparatus according to claim 1, wherein the threshold temperature is corrected to be lower in a case that a basis weight of the recording material is smaller than a predetermined basis weight and to be higher in a case that the basis weight of the recording material is larger than the predetermined basis weight.

16. An image forming apparatus according to claim 1, wherein the control unit starts the second control when a waiting time elapses after the temperature detected by the first temperature detecting unit reaches the threshold temperature and the recording material reaches the nip portion.

17. An image forming apparatus according to claim 16, further comprising a current detecting unit configured to detect a current supplied to the fixing device from the AC power source, wherein the waiting time is corrected based on a power supply voltage calculated based on a current value detected by the current detecting unit.

18. An image forming apparatus according to claim 16, wherein the waiting time is corrected to be longer in a case that the power supply voltage is lower than a predetermined voltage and to be shorter in a case that the power supply voltage is higher than the predetermined voltage.

19. An image forming apparatus according to claim 16, wherein the waiting time is corrected to be shorter in a case that a basis weight of the recording material is smaller than a predetermined basis weight and to be longer in a case that the basis weight of the recording material is larger than the predetermined basis weight.

* * * * *